US010989640B2

(12) United States Patent
Li et al.

(10) Patent No.: US 10,989,640 B2
(45) Date of Patent: Apr. 27, 2021

(54) METHOD FOR DEFINING THRESHOLD STRESS CURVES UTILIZED IN FATIGUE AND DAMAGE TOLERANCE ANALYSIS

(71) Applicant: Bell Helicopter Textron Inc., Fort Worth, TX (US)

(72) Inventors: Xiaoming Li, Colleyville, TX (US); Bogdan R. Krasnowski, Bedford, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 344 days.

(21) Appl. No.: 16/125,294

(22) Filed: Sep. 7, 2018

(65) Prior Publication Data

US 2019/0003944 A1 Jan. 3, 2019

Related U.S. Application Data

(63) Continuation-in-part of application No. 15/079,946, filed on Mar. 24, 2016, now Pat. No. 10,094,751.

(60) Provisional application No. 62/137,427, filed on Mar. 24, 2015.

(51) Int. Cl.
  *G01N 3/32* (2006.01)
  *G01N 3/06* (2006.01)
(52) U.S. Cl.
  CPC .............. *G01N 3/32* (2013.01); *G01N 3/066* (2013.01)
(58) Field of Classification Search
  CPC .......... G01N 3/23; G01N 3/006; G01N 3/02; G01N 3/38; G01N 3/62; G01N 3/32; B32B 15/016; B27B 27/02; C08F 10/00; G06F 30/15; G06F 30/23
  See application file for complete search history.

(56) References Cited

U.S. PATENT DOCUMENTS

| 3,774,443 A | 11/1973 | Green |
| 3,957,450 A | 5/1976 | Salt |
| 3,983,745 A * | 10/1976 | Juusola ................... G01N 3/32 73/789 |
| 4,090,401 A | 5/1978 | Yamamoto et al. |

(Continued)

FOREIGN PATENT DOCUMENTS

EP 3073245 B1 9/2018

OTHER PUBLICATIONS

Office Action, dated Jan. 31, 2020, by the USPTO, re U.S. Appl. No. 16/124,762.

(Continued)

*Primary Examiner* — Regis J Betsch
*Assistant Examiner* — Kaleria Knox
(74) *Attorney, Agent, or Firm* — Timmer Law Group, PLLC

(57) ABSTRACT

A method for defining a threshold stress curve utilized in fatigue and/or damage tolerance analysis, the method including conducting a direct test method on a plurality of specimens with a notch to generate raw data, the notch in each of the specimens having a notch dimension; determining a plurality of analyzed data points based upon the raw data; determining a regression line based upon the plurality of data points, the regression line including an exponential portion and a power law portion; and connecting the exponential portion and the power law portion of the regression line to form a threshold stress curve based on the regression line.

12 Claims, 15 Drawing Sheets

(56) References Cited

U.S. PATENT DOCUMENTS

| | | | |
|---|---|---|---|
| 4,090,489 A | 5/1978 | Barker | |
| 4,116,049 A | 9/1978 | Barker | |
| 4,164,874 A | 8/1979 | Cassatt | |
| 4,299,120 A | 11/1981 | Barker | |
| 4,453,423 A * | 6/1984 | Fulton | G01N 3/02 29/421.2 |
| 4,590,804 A | 5/1986 | Brull | |
| 4,895,027 A | 1/1990 | Manahan, Sr. | |
| 4,934,199 A * | 6/1990 | Avila | B27B 27/02 73/863 |
| 5,078,843 A | 1/1992 | Pratt | |
| 5,079,955 A | 1/1992 | Eberhardt | |
| 5,213,639 A * | 5/1993 | Colvin | B32B 15/016 148/417 |
| 5,231,639 A * | 7/1993 | Matui | H04L 27/34 375/354 |
| 5,654,500 A | 8/1997 | Herron | |
| 6,403,181 B1 * | 6/2002 | Barry | C08F 10/00 428/36.9 |
| 6,405,600 B1 | 6/2002 | Matic | |
| 6,543,273 B1 * | 4/2003 | Wells | G01N 3/02 73/12.01 |
| 6,588,283 B2 | 7/2003 | Wang | |
| 7,230,421 B2 | 6/2007 | Goldfine | |
| 7,320,242 B2 | 1/2008 | Hoo Fatt | |
| 7,480,573 B2 * | 1/2009 | Toyosada | G01N 3/32 702/34 |
| 7,533,557 B1 | 5/2009 | Mott | |
| 7,623,973 B1 | 11/2009 | Wang | |
| 7,994,781 B2 | 8/2011 | Goldfine | |
| 8,109,150 B2 | 2/2012 | Sato | |
| 8,176,795 B2 | 5/2012 | Wang | |
| 8,479,588 B1 | 7/2013 | Simkins, Jr. | |
| 8,571,814 B2 | 10/2013 | Zhao | |
| 8,610,883 B2 | 12/2013 | Lam | |
| 8,707,797 B2 * | 4/2014 | Pettit | G01N 3/38 73/808 |
| 8,763,229 B2 | 7/2014 | Reid | |
| 8,984,955 B2 | 3/2015 | Mouri | |
| 8,990,028 B2 * | 3/2015 | Yonemura | G06F 30/15 702/42 |
| 9,109,979 B2 | 8/2015 | Dietrich | |
| 9,222,865 B2 | 12/2015 | Khonsari | |
| 9,243,985 B2 | 1/2016 | Khonsari | |
| 9,280,620 B2 * | 3/2016 | Amann | G06F 30/23 |
| 9,383,303 B2 | 7/2016 | Bruchhausen | |
| 9,423,330 B2 | 8/2016 | Mary | |
| 9,464,975 B2 | 10/2016 | Esposito | |
| 9,476,815 B2 | 10/2016 | Khonsari | |
| 9,573,284 B2 | 2/2017 | Thwing | |
| 9,702,798 B1 | 7/2017 | Kim | |
| 9,841,364 B2 | 12/2017 | Chen | |
| 10,094,751 B2 | 10/2018 | Li et al. | |
| 2004/0118813 A1 | 6/2004 | Lai | |
| 2008/0052014 A1 * | 2/2008 | Toyosada | G01N 3/32 702/34 |
| 2008/0289178 A1 | 11/2008 | Nashner et al. | |
| 2009/0315540 A1 | 12/2009 | Goldfine | |
| 2011/0005329 A1 | 1/2011 | Matsuoka | |
| 2013/0298692 A1 * | 11/2013 | Seok | G01N 3/62 73/804 |
| 2015/0114697 A1 | 4/2015 | Murrell | |
| 2016/0061688 A1 | 3/2016 | Van Wittenberghe | |
| 2016/0282244 A1 | 9/2016 | Li et al. | |
| 2016/0349161 A1 | 12/2016 | Chen | |
| 2019/0062885 A1 | 2/2019 | Prasannavenkatesan et al. | |
| 2020/0025661 A1 | 1/2020 | Li et al. | |

OTHER PUBLICATIONS

Wikipedia, The Free Encyclopedia, "Electrical Discharged Machining" via https://en.wikipedia.org/wiki/Electrical_discharge_maching; pp. 1-5; 2019.

Office Action dated Oct. 6, 2017, by the USPTO, re U.S. Appl. No. 15/079,964.

Notice of Allowance dated Jun. 6, 2018, by the USPTO, re U.S. Appl. No. 15/079,964.

Corrected Notice of Allowance dated Aug. 8, 2018, by the USPTO, re U.S. Appl. No. 15/079,964.

European Search Report, dated Nov. 24, 2016, by the EPO, re EP Patent App No. 16162437.

EP Communication under Rule 71(3) EPC, dated May 18, 2018, by the EPO, re EP Patent App No. 16162437.4.

EP Decision to Grant, dated Aug. 17, 2018, by the EPO, re EP Patent App No. 16162437.4.

Brett L. Anderson, et al; Evaluation and Verification of Advanced Methods to Assess Multiple-Site Damage of Aircraft Structure; Oct. 2004; URL: https://web.archive.org/web/20111018161217/http://airportaircraftsafetyrd.tc.faa.gov/Programs/agingaircraft/Structural/reports/04-42-Vol-I.pdf, (20161118).

K.A. Zakaria, et al.; Fractogrpahy Analysis of A16061 Under Fatigue Spectrum Loadings; Engineering e-Transaction, vol. 7, No. 1, Jun. 2012, pp. 28-33.

ASTM International, Standard Test Method for Measurement of Fatigue Crack Growth Rates, Apr. 2008, 46 pages, Pennsylvania, US.

\* cited by examiner

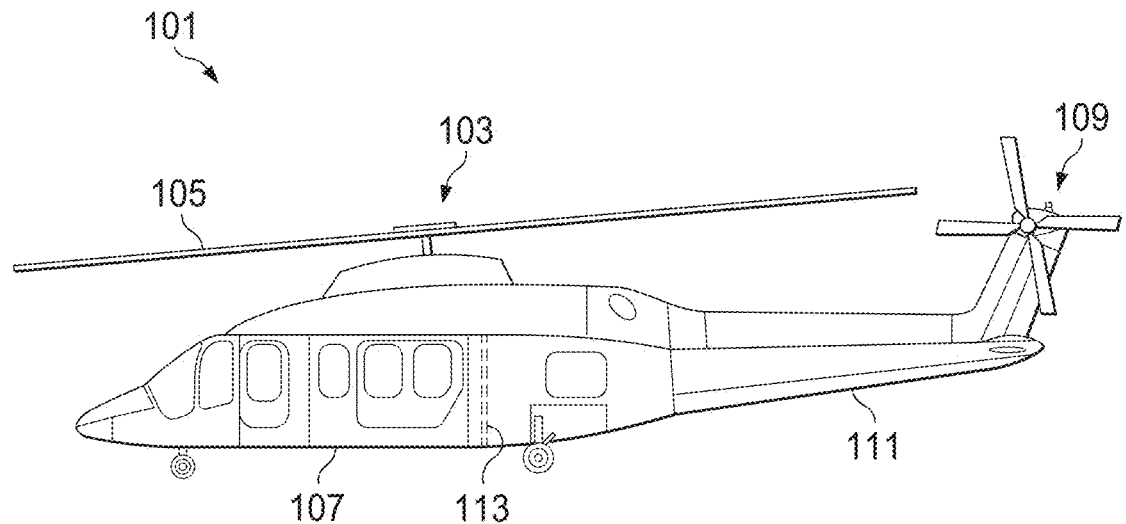
FIG. 1
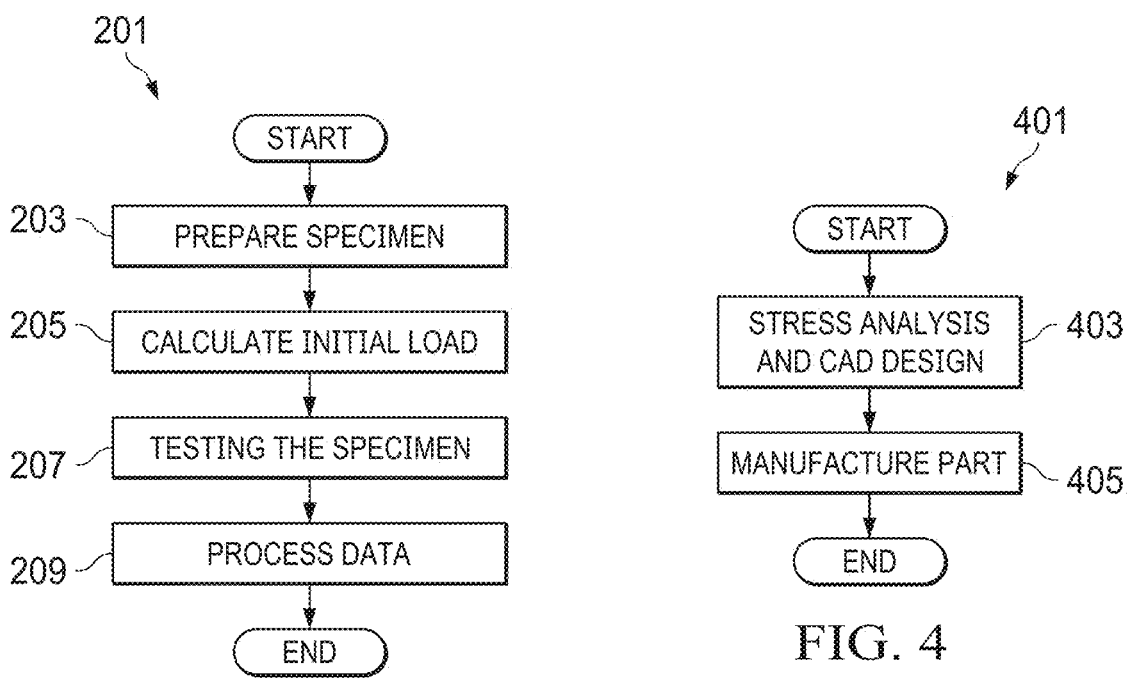
FIG. 2
FIG. 4

| $c_1/c_2$ | $c_1/b_1$ | $c_2/b_2 = 0.0$ | | $c_2/b_2 = 0.1$ | | $c_2/b_2 = 0.2$ | | $c_2/b_2 = 0.5$ | | $c_2/b_2 = 0.8$ | | $c_2/b_2 = 1.0$ | |
|---|---|---|---|---|---|---|---|---|---|---|---|---|---|
| | | a-tip | c-tip | a-tip | c-tip | a-tip | c-tip | a-tip | c-tip | a-tip | c-tip | a-tip | c-tip |
| 0.0 | 0.0 | 0.996 | 1.931 | 1.000 | 2.024 | 0.996 | 1.907 | 1.003 | 1.906 | 1.000 | 1.870 | 1.004 | 1.846 |
| | 0.1 | 1.062 | 1.930 | 1.068 | 1.973 | 1.069 | 1.924 | 1.069 | 1.795 | 1.057 | 1.705 | 1.055 | 1.645 |
| | 0.2 | 1.191 | 2.009 | 1.196 | 2.021 | 1.200 | 2.005 | 1.191 | 1.914 | 1.182 | 1.854 | 1.174 | 1.814 |
| | 0.5 | 1.766 | 2.817 | 1.786 | 2.874 | 1.816 | 2.909 | 1.935 | 3.034 | 2.070 | 3.171 | 2.187 | 3.278 |
| | 0.8 | 2.524 | 4.427 | 2.606 | 5.038 | 2.715 | 5.389 | 3.291 | 6.605 | 4.126 | 7.951 | 4.832 | 8.979 |
| | 1.0 | 3.140 | 5.955 | 3.278 | 7.366 | 3.471 | 8.289 | 4.635 | 11.871 | 6.432 | 15.372 | 7.925 | 17.706 |
| 0.2 | 0.0 | 1.037 | 1.280 | 1.041 | 1.285 | 1.043 | 1.291 | 1.070 | 1.330 | 1.102 | 1.390 | 1.128 | 1.441 |
| | 0.1 | 1.078 | 1.311 | 1.083 | 1.318 | 1.087 | 1.322 | 1.116 | 1.355 | 1.145 | 1.406 | 1.169 | 1.452 |
| | 0.2 | 1.157 | 1.374 | 1.161 | 1.380 | 1.169 | 1.388 | 1.207 | 1.420 | 1.240 | 1.470 | 1.268 | 1.513 |
| | 0.5 | 1.515 | 1.752 | 1.536 | 1.787 | 1.571 | 1.833 | 1.732 | 1.993 | 1.944 | 2.243 | 2.124 | 2.448 |
| | 0.8 | 2.031 | 2.498 | 2.098 | 2.663 | 2.196 | 2.832 | 2.749 | 3.528 | 3.623 | 4.603 | 4.378 | 5.491 |
| | 1.0 | 2.475 | 3.286 | 2.578 | 3.585 | 2.749 | 3.931 | 3.790 | 5.340 | 5.523 | 7.514 | 7.026 | 9.311 |
| 0.4 | 0.0 | 1.073 | 1.173 | 1.077 | 1.177 | 1.082 | 1.183 | 1.130 | 1.244 | 1.201 | 1.314 | 1.254 | 1.365 |
| | 0.1 | 1.094 | 1.196 | 1.097 | 1.201 | 1.104 | 1.206 | 1.161 | 1.267 | 1.233 | 1.343 | 1.289 | 1.398 |
| | 0.2 | 1.131 | 1.241 | 1.135 | 1.246 | 1.147 | 1.257 | 1.227 | 1.337 | 1.306 | 1.417 | 1.375 | 1.488 |
| | 0.5 | 1.317 | 1.488 | 1.339 | 1.521 | 1.378 | 1.567 | 1.577 | 1.749 | 1.865 | 2.072 | 2.117 | 2.349 |
| | 0.8 | 1.636 | 1.985 | 1.691 | 2.069 | 1.780 | 2.198 | 2.318 | 2.781 | 3.239 | 3.816 | 4.066 | 4.723 |
| | 1.0 | 1.941 | 2.504 | 2.015 | 2.638 | 2.167 | 2.861 | 3.111 | 3.972 | 4.813 | 5.875 | 6.355 | 7.559 |
| 0.5 | 0.0 | 1.086 | 1.158 | 1.090 | 1.160 | 1.097 | 1.165 | 1.150 | 1.220 | 1.235 | 1.302 | 1.308 | 1.381 |
| | 0.1 | 1.102 | 1.179 | 1.106 | 1.180 | 1.113 | 1.185 | 1.178 | 1.245 | 1.271 | 1.339 | 1.350 | 1.424 |
| | 0.2 | 1.130 | 1.211 | 1.134 | 1.217 | 1.147 | 1.228 | 1.238 | 1.310 | 1.345 | 1.417 | 1.439 | 1.511 |
| | 0.5 | 1.272 | 1.414 | 1.294 | 1.446 | 1.335 | 1.492 | 1.550 | 1.684 | 1.879 | 2.045 | 2.161 | 2.355 |
| | 0.8 | 1.546 | 1.827 | 1.596 | 1.899 | 1.684 | 2.018 | 2.224 | 2.574 | 3.169 | 3.609 | 4.010 | 4.516 |
| | 1.0 | 1.801 | 2.260 | 1.871 | 2.368 | 2.021 | 2.558 | 2.931 | 3.568 | 4.595 | 5.380 | 6.163 | 7.059 |
| 1.0 | 0.0 | 1.138 | 1.138 | 1.142 | 1.141 | 1.145 | 1.144 | 1.236 | 1.192 | 1.416 | 1.343 | 1.601 | 1.523 |
| | 0.1 | 1.141 | 1.142 | 1.144 | 1.144 | 1.154 | 1.152 | 1.261 | 1.220 | 1.470 | 1.399 | 1.683 | 1.609 |
| | 0.2 | 1.144 | 1.145 | 1.152 | 1.154 | 1.172 | 1.172 | 1.309 | 1.267 | 1.565 | 1.486 | 1.801 | 1.685 |
| | 0.5 | 1.198 | 1.232 | 1.220 | 1.261 | 1.267 | 1.309 | 1.547 | 1.547 | 2.075 | 2.056 | 2.555 | 2.514 |
| | 0.8 | 1.364 | 1.413 | 1.399 | 1.470 | 1.486 | 1.565 | 2.056 | 2.075 | 3.171 | 3.171 | 4.196 | 4.162 |
| | 1.0 | 1.481 | 1.615 | 1.545 | 1.686 | 1.685 | 1.801 | 2.514 | 2.555 | 4.162 | 4.190 | 5.977 | 5.977 |

FIG. 3

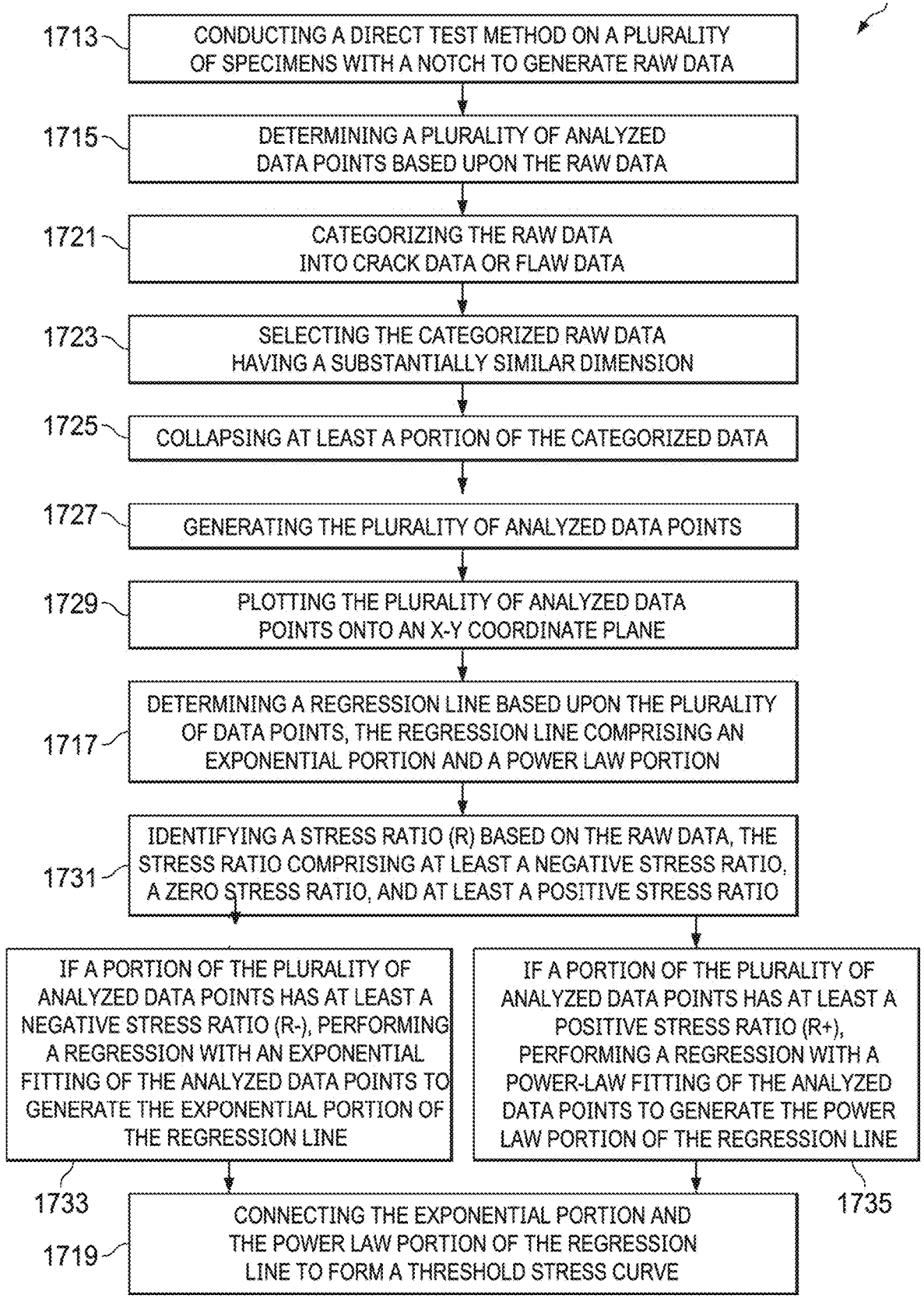

METHOD FOR DEFINING THRESHOLD STRESS CURVES UTILIZED IN FATIGUE AND DAMAGE TOLERANCE ANALYSIS

CROSS-REFERENCE TO RELATED APPLICATIONS

This application claims priority to and is a continuation-in-part patent application of U.S. patent application Ser. No. 15/079,946, filed Mar. 24, 2016, which claims priority to U.S. provisional application No. 62/137,427, filed Mar. 24, 2015, which are hereby incorporated by reference for all purposes as if fully set forth herein.

TECHNICAL FIELD

The embodiments of the present disclosure relate to a method for defining threshold stress curves utilized in damage tolerance analysis for a structure, such as an aircraft structure.

DESCRIPTION OF RELATED ART

Conventional method of determining fatigue and damage tolerance allowables for aircraft structure can include multiple steps of approximations and derivations that have conservatism and variability, which can result in the designing of aircraft structures with too much conservatism, thus being heavier than actually necessary. A conventional method of calculating fatigue and damage tolerance allowables is outlined in ASTM E647.

There is a need for an improved method of determining fatigue and damage tolerance allowables.

SUMMARY

In a first aspect, there is a method for defining a threshold stress curve utilized in damage tolerance analysis, the method including conducting a direct test method on a plurality of specimens with a notch to generate raw data, the notch in each of the specimens having a notch dimension; determining a plurality of analyzed data points based upon the raw data; determining a regression line based upon the plurality of data points, the regression line including an exponential portion and a power law portion; and connecting the exponential portion and the power law portion of the regression line to form a threshold stress curve based on the regression line.

In an embodiment, each of the specimens has a square cross-sectional portion and the notch is located in a corner of the square cross-sectional portion.

In another embodiment, the step of conducting the direct test method includes applying a cyclic load to each of the specimens in a plurality of specimens with a notch until a first crack emanating from the notch is detected, the cyclic load having a maximum load and a minimum load; and applying a subsequent cyclic load to each of the specimens until extension of the first crack to form a second crack emanating from the first crack is detected, the subsequent cyclic load having the same maximum load but a greater minimum load.

In yet another embodiment, the step of determining a plurality of analyzed data points includes categorizing the raw data into crack data or flaw data.

In an exemplary embodiment, the step of determining a plurality of analyzed data points includes selecting the categorized raw data of a substantially similar dimension.

In another embodiment, the step of determining a plurality of analyzed data points includes collapsing at least a portion of the categorized raw data to a nominal dimension.

In an embodiment, the substantially similar dimension includes at least one of the following: a flaw size, a notch length, and a crack length.

In still another embodiment, the step of adjusting the raw data includes generating the plurality of analyzed data points from the categorized and selected raw data.

In an illustrative embodiment, the step of determining a plurality of analyzed data points includes plotting the plurality of analyzed data points onto an X-Y coordinate plane.

In an embodiment, the step of determining a regression line based upon the plurality of data points further includes identifying a stress ratio (R) based on the raw data, the stress ratio including at least a negative stress ratio, a zero stress ratio, and at least a positive stress ratio.

In another embodiment, the step of determining a regression line based upon the plurality of data points further includes: if a portion of the plurality of analyzed data points has at least a negative stress ratio (R−), performing a regression with an exponential fitting of the plurality of analyzed data points having the negative stress ratio to generate the exponential portion of the regression line; and if a portion of the plurality of the analyzed data points has at least a positive stress ratio (R+), performing a regression with a power law fitting of the plurality of analyzed data points having the positive stress ratio to generate the power law portion of the regression line.

In yet another embodiment, the step of connecting includes performing a derivative function to have a smooth connection between the exponential portion and the power law portion of the regression line.

In an exemplary embodiment, points below the threshold stress curve indicate that a flaw or crack is not growing and points above the threshold stress curve indicate that a flaw or crack is growing.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the system and method of the present disclosure are set forth in the appended claims. However, the system and method itself, as well as a preferred mode of use, and further objectives and advantages thereof, will best be understood by reference to the following detailed description when read in conjunction with the accompanying drawings, wherein:

FIG. 1 is a side view of a rotorcraft, according to one example embodiment;

FIG. 2 is a schematic view of a method of determining fatigue and damage tolerance allowables, according to one example embodiment;

FIG. 3 is a table, according to one example embodiment;

FIG. 4 is a schematic view of a method of manufacturing a part, according to one example embodiment;

FIG. 25 is a schematic view of a method for defining a threshold stress curve utilized in damage tolerance analysis, according to one example embodiment;

DESCRIPTION OF THE PREFERRED EMBODIMENT

Figure 5:
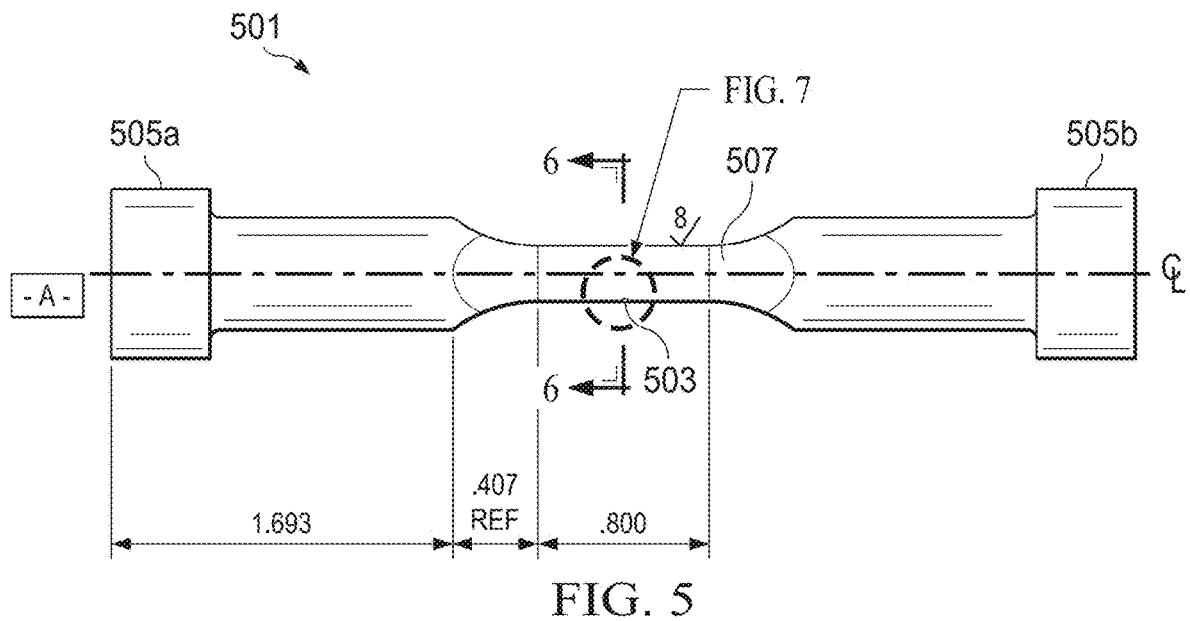
FIG. 5 is a side view of a specimen, according to one example embodiment.
Figure 6:
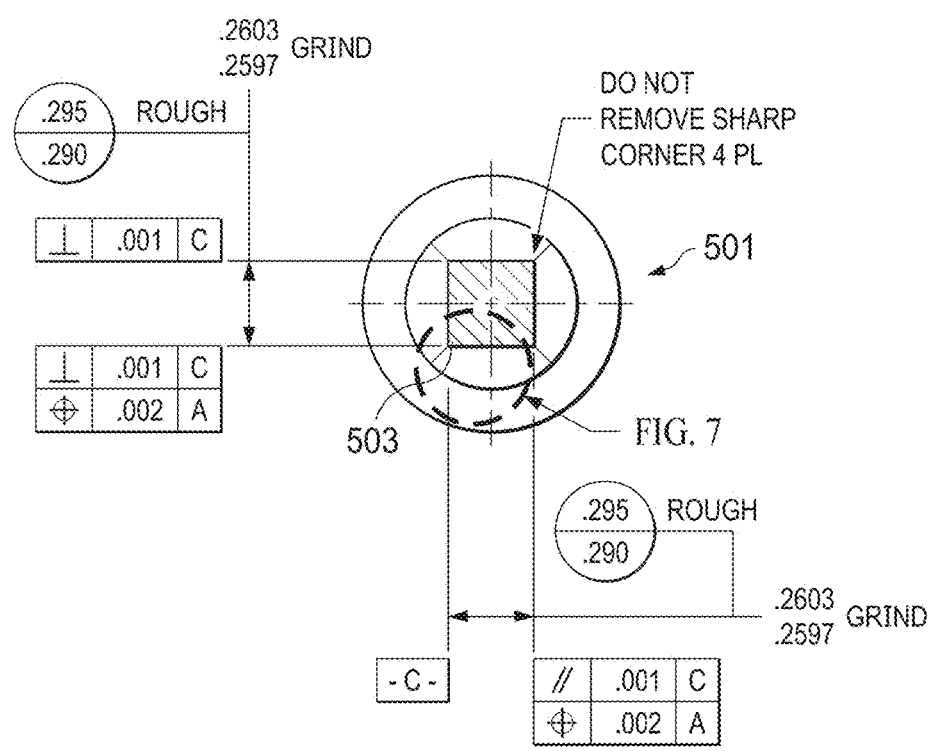
FIG. 6 is a cross-section view take at section lines 6-6 in FIG. 5, according to one example embodiment.

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Fatigue and damage tolerance allowables are essential for the damage tolerance design of rotorcraft structures, such as dynamic parts. When an aircraft is designed to certain usage and load conditions, the combination of those conditions flow down to the structures and translate into a certain stress level that depends upon the material composition of the parts and the detail design of the parts. A comparison of that stress level of the part to the fatigue and damage tolerance allowables determines whether the part can satisfy the damage tolerance requirements with the particular design. For a no-growth design, if the stress level exceeds the fatigue and damage tolerance allowables, the part requires re-design to reduce the stress level of the part, which typically causes an increase in the weight of the part or a decrease in the overall load and usage capability of the aircraft.

If the fatigue and damage tolerance allowables are overly conservative, the stress level of the part would have to be designed to meet the overly conservative damage tolerance criteria, which would cause the size (and weight) of the part to increase to meet the given usage and load requirements of the aircraft. Alternatively, the usage and load capabilities of the aircraft would need to be lowered to maintain any weight requirements.

Conventional ideology of determining damage tolerance requirements includes introduction of a crack in a critical location of a structure and analyzing the growth of that crack due to the aircraft usage and loading. Conventionally, in order to satisfy damage tolerance requirements for high stress high frequency loaded rotorcraft structures, the initial crack must not be allowed to grow. The term that describes this "no growth" phenomena is called "threshold value." Since the threshold values for small cracks were difficult to determine in the laboratory, the conventional method (ASTM E647) determines threshold values obtained by testing the long crack growth under decreasing loading until the crack stops growing. Based on threshold values obtained in such approximate ways, the small crack no-growth fatigue and damage tolerance allowables are derived with further approximations and knockdowns. Multiple steps of approximations and derivations result in conservatism and variability, thus generating overly conservative fatigue and damage tolerance allowables.

The present disclosure includes methods and systems of generating no-growth fatigue and damage tolerance allowables for structures, which generate pertinent stress level in the damage tolerant designed part to meet compliance requirements of the aircraft. Certain embodiments of the methods and systems of directly obtaining no-growth fatigue and damage tolerance allowables for aircraft structure may prevent the necessity of full scale aircraft structure testing that may otherwise be required for certification. The method of the present application is a coupon specimen testing method that generates threshold stress data for fatigue crack initiation and for crack onset of a small crack in a metallic material. In one embodiment, "threshold" can be the fatigue stress state {mean stress, oscillatory stress}, below which a flaw or a crack in a metallic material will not grow. As such, threshold stress may also be called "no-growth threshold." In some embodiments, a flaw is at least one of the following defects in a metallic material: porosity, blowholes, inclusions, sponginess, shrinkage, hot tears, cold shuts, unfused chaplet, misplaced core, segregations, depressions, slag spot defects, interruptions or discontinuities in physical characteristics, and other non-crack defects. In an embodiment, a crack is at least one surface having at least a portion within the coupon specimen.

In one embodiment, the test method generates threshold stress data for crack initiation. The test specimen can be a square-bar coupon, cyclically loaded along the axis. Each coupon specimen contains a notch at a corner of the centerplane of the specimen to simulate a flaw.

Figure 23:
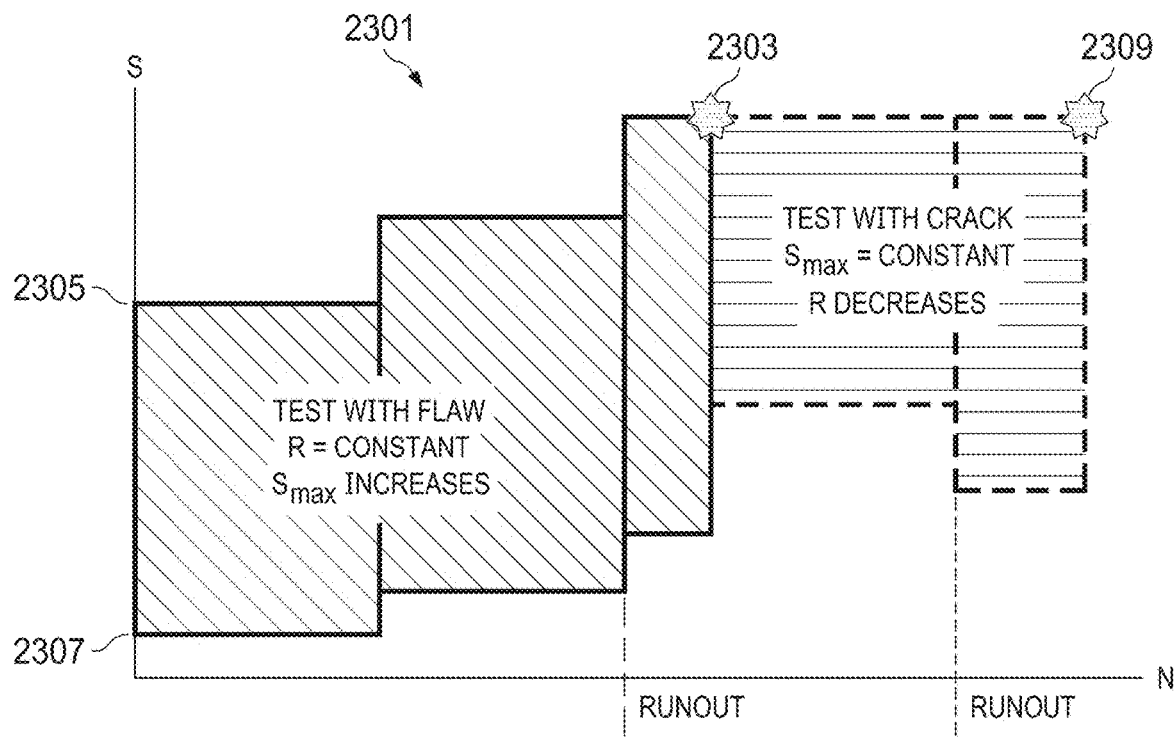
FIG. 23 is a graphical representation of a testing method, according to one example embodiment.

Referring to FIG. 23, a graphic 2301 illustrates how the method derives the threshold stress. The test starts at required stress ratio R with an initial load max 2305 and initial load min 2307. If crack initiation occurs and the criterion $\Delta a_o/\Delta N \leq 4 \times 10^{-9}$ in/cycle is met, this load is the threshold fatigue load, from which the threshold stress of the material can be obtained. Otherwise if with that load the number of cycle reaches $N_0=1,000,000$ without crack initiation, the load will be bumped up to a higher level and the test will be repeated. The number of 1,000,000 cycles can be chosen because it meets the threshold criterion with the maximum presumed crack initiation (0.004-in) even if it does not happen. This way the necessary conservatism of the data is ensured. This process can be repeated until crack initiation occurs at an occurrence 2303 and the threshold criterion is not met. In this case, the previous load level will be used for no-growth threshold stress of the flaw.

Once the crack initiation occurs at the occurrence 2303, the testing continues and turns into determination of threshold stress for a crack, which becomes evident by a crack growth occurrence 2309. The testing maintains the last maximum load for the test with the flaw to avoid overload effect, but changes the minimum load. The same process as testing with flaw is used and may need to be repeated until the threshold stress is achieved for the crack.

Figure 24:
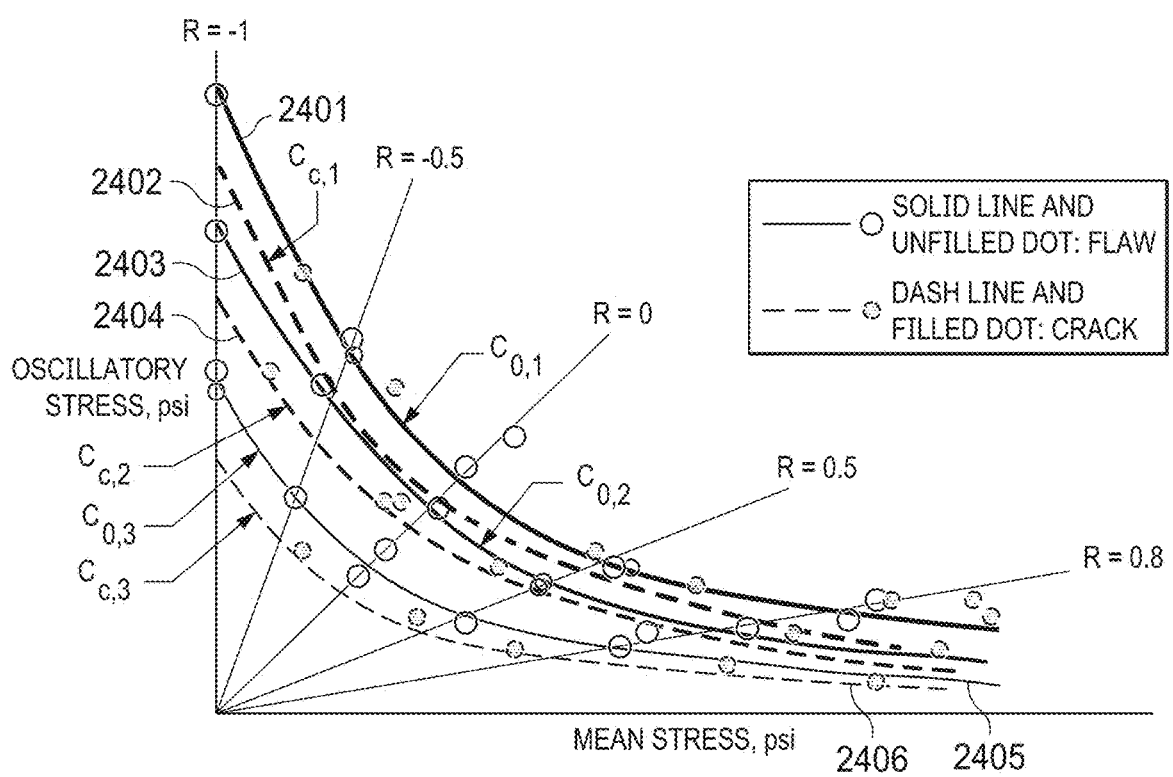
FIG. 24 is a graphical representation of threshold stress curves for flaws and cracks, according to one example embodiment.

Referring now also to FIG. 24, the tests can be performed with various stress ratios R for the specimens of the same notch size $c_0$, which together generate threshold stress curves $\{s_{mean}, s_{osc}\}$ for a notch length $c_{0,1}$. In the same way, threshold stress curves can be determined for various flaw sizes, shown as solid lines 2401, 2403, 2405 in FIG. 24. Similarly, the data obtained for various crack lengths can also form the threshold stress curves for no-growth of crack(s), shown as dotted lines 2402, 2404, 2406 in FIG. 24. Regarding FIG. 24, exemplary threshold stress data generated via the test method is illustrated, wherein ($c_{0,1} < c_{0,2} < c_{0,3}$).

Referring now to FIG. 1 in the drawings, a rotorcraft 101 is illustrated. Rotorcraft 101 can have a rotor system 103 with a plurality of rotor blades 105. The pitch of each rotor blade 105 can be manipulated in order to selectively control direction, thrust, and lift of rotorcraft 101. Rotorcraft 101 can further include a fuselage 107, anti-torque system 109, and an empennage 111. The structure of rotorcraft 101 can include a variety of airframe structures, such as bulkheads, ribs, longerons, stringers, keels, skins, spars, to name a few examples. A bulkhead 113 is labeled for illustrative purposes.

The methods and systems of the present disclosure relate to determining damage tolerance ("DT") allowables for a structure, such as an aircraft structure. It should be appreciated that rotorcraft 101 is merely illustrated as one of many different types of aircraft whose structure can be analyzed and designed using the methods and systems of the present disclosure. Furthermore, other aircraft can include, fixed wing aircraft, hybrid aircraft, unmanned aircraft, tiltrotor aircraft, to name a few examples.

Referring now also to FIG. 2, a method 201 of directly determining fatigue and damage tolerance allowables is schematically illustrated. In one embodiment, method 201 is a test method for determining no-growth threshold stress for a flaw or a crack in a metallic component. Applicable metals can include aluminum, titanium, and steel, to name a few examples. The conventional ASTM E647 method derives crack growth threshold ($\Delta K_{TH}$) from the derived crack growth rate curve (da/dN vs. $\Delta K$) that is based on crack growth testing a-N data, where K is stress intensity factor (SIF). Once $\Delta K_{TH}$ is derived, it is further converted into no-growth threshold fatigue stress. As a contrast, the direct test method 201 can generate a fatigue stress data in which a flaw or a crack will not grow. In this way, the no-growth fatigue and damage tolerance allowables can be determined based on the directly obtained fatigue test stress data.

Method 201 can include a step 203 of preparing a specimen, a step 205 of calculating an initial load, a step 207 of testing the specimen, and a step 209 of processing data. Each of these steps are described in further detail herein.

Alternating or Oscillatory Stress ($s_{osc}$): The alternating stress is one half of the stress range during a stress cycle.

Maximum Stress ($\sigma_{max}$): The highest algebraic value of stress in the stress cycle, tensile stress being considered positive and compressive stress negative.

Mean Stress (Steady Stress, $s_{mean}$): The algebraic mean of the maximum and minimum stress in one stress cycle. A tensile stress is considered positive.

Minimum Stress ($\sigma_{min}$): The lowest algebraic value of the stress in the stress cycle.

Scatter: This term usually refers to the scatter of test points which define a $\sigma_{osc}$-$\sigma_{mean}$ curve.

Stress Cycle (N): A stress cycle is the smallest section of the stress-time function which can be repeated periodically and identically.

Stress Ratio (R): The ratio of minimum stress divided by maximum stress.

Crack Initiation: In one example embodiment, crack initiation is when a pre-crack appears beyond 0.001-inch but shorter than 0.004-inch (0.001-inch$\leq \Delta c_{i,o} \leq$0.004-inch), indicated by the potential drop method (PDM) during testing. i=1, 2, the two sides of gauge of the corner crack test coupon on which notch (and crack) can be observed.

Initial Flaw Size ($c_{i,o}$): Initial flaw size is defined as one of the design requirements for a DT part in which a flaw of the initial flaw size does not grow.

Initial Crack Size ($c_{i,c}$): In one example embodiment, the initial crack size is the size of crack initiation.

Crack Growth Increment ($\Delta c_i$): In one example embodiment, the crack growth increment is the length of crack initiation.

Initial Load ($P_o$): A load the test starts with.

Final Load ($P_C$): The load at which the notch starts to grow.

Test and Testing Block: A Test is an iterating process of stepped load with one time set up of testing frame. In one example embodiment, a Testing Block is counted as a 1,000,000 cycle run of fatigue test except the last block for which the flaw/crack starts to grow before it reaches the 1,000,000 cycles.

PD or PDM: Potential drop or potential drop method. A method to indicate occurrence of crack growth by monitoring voltage change of a special detection system.

Referring now also to FIGS. 5-8, a specimen 501 which can also be referred to herein as "Ks Bar", is illustrated. In one example embodiment, specimen 501 is a bar coupon for an axially loaded fatigue test that has a gauge of square cross-section and a corner notch 503 on the middle plane of the specimen 501. As shown in FIG. 5, the specimen 501 is symmetric about a center-plane.

Method 201 generates crack initiation data with using one or more specimens 501, each with a corner notch 503 at the center-plane of the specimen 501. In one implementation, three notch sizes can be utilized. Example nominal notch sizes for general metal-forming materials are 0.005-inch, 0.010-inch, and 0.015-inch, measured on each side of the corner of the specimen 501. Example nominal notch sizes for casting materials are 0.015-inch, 0.025-inch, and 0.050-inch, also measured on each side of the specimen 501. For each notch size, twelve coupons can be used to support the tests at five stress ratios, viz. R=−1, −0.5, 0.05, 0.5, 0.8. Among these five stress ratios, R=0.05 is primary and at least four specimens 501 can be used to support the R=0.05 tests. For the other four stress ratio tests, at least two specimens 501 can be used for each stress ratio tests. Table 1 lists an example specimen matrix for the requirements of test specimens, i.e., thirty-six coupons. In addition, four un-notched spare specimens 501 can be used to mitigate unexpected events, resulting in a total of forty coupons that can be used in the example test program. It should be appreciated that the exact quantity of specimens 501 used in method 501 is implementation specific; furthermore, the quantity of specimens 501 described herein are for exemplary purposes and are not intended to be restrictive.

TABLE 1

Specimen Matrix

| $c_{i,o}$ (in) | | Stress Ratio | | | | | | |
|---|---|---|---|---|---|---|---|---|
| | | −1 | −0.5 | 0.05 | 0.5 | 0.8 | | |
| Wrought | Casting | | | Specimen Number | | | Total | Spare |
| 0.005 | 0.015 | | | | | | TBD | |
| 0.010 | 0.025 | | | | | | TBD | |
| 0.015 | 0.050 | | | | | | TBD | |
| | | | | | | | TBD | TBD |
| | | | | | | | Total | TBD |

Depending on the probable flaw (or crack) orientation in a structural part for which the threshold stress data of the material is desired, the specimen 501 is machined from the material direction so that the corner notch 503 of the specimen 501 is of the same material orientation as in the structural part.

For instance, a probable flaw in the S-T (or R—C) material orientation is possible in a structural part and no-growth threshold stress data is needed. For wrought materials, the axial direction of the specimen 501 can align with the thickness direction if it is made from a thick plate, or can align with the radius direction if it is made from a round bar. With this alignment, the corner notch 503 of a specimen 501 is in the S-T or R—C orientation. There may not be a specific requirement on alignment of the specimen 501 with respect to the sand casting material since the grain direction is not significant in such a case. The length of the specimen 501 can be any implementation specific length; however, one example length is approximately four inches. Another example length is five inches. The head buttons 505a and 505b of the specimen 501 are designed for the axial load application, for which the perpendicularity of the shoulders to the axis of the specimen 501 is desired during the test.

Figure 7:
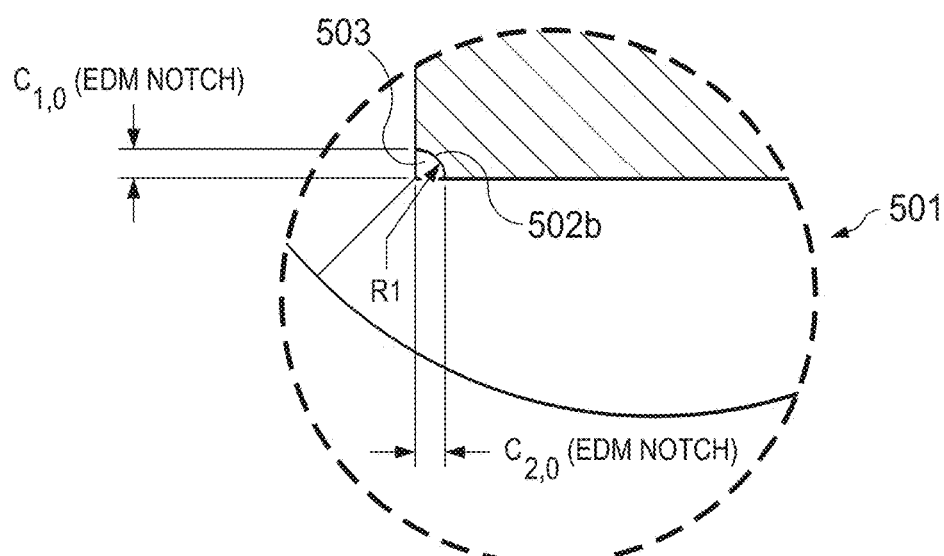
FIG. 7 is a detail view taken from FIG. 6, according to one example embodiment.
Figure 8:
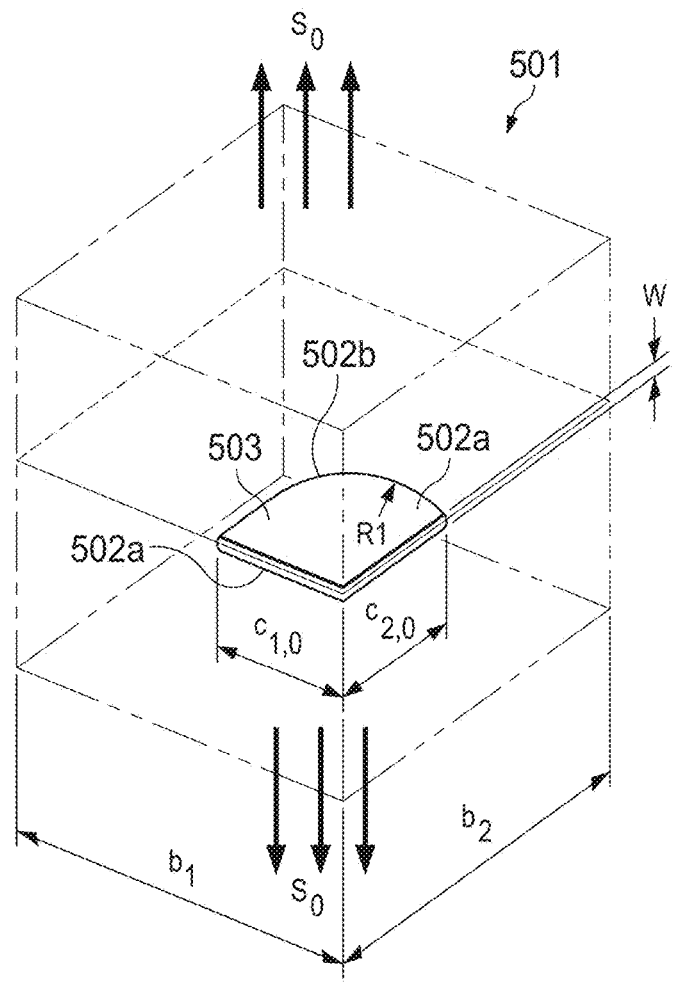
FIG. 8 is a stylized perspective view of a specimen, according to one example embodiment.

In the example embodiment, a gauge section 507 is of square cross-section. The notch 503 includes a pair of lateral side walls 502a and a root 502b disposed therebetween. The center cross-section of the gauge section 507 is the mid-plane (also symmetric plane) of the specimen 507, on which a notch 503 is induced at a corner, as shown at least in FIGS. 7 and 8. In one example embodiment, the nominal dimensions of corner notch 503 is $c_{i,0}$=0.05, 0.010, or 0.015 for metal-forming materials and 0.015, 0.025, or 0.050 for casting materials, where i=1 (Side 1) and 2 (Side 2), measured from the corner point of the specimen 501 to the tip of the notch 503 on each side of the gauge, as shown in FIG. 8. In one example embodiment, the width W of the corner notch 503 is 0.003-inch. It is desired that the bottom of the corner notch 503 (also called notch front) have a curved portion R1 as shown in FIGS. 7 and 8.

The material of the specimen 501 should be the same as the material as the structural part of which the fatigue and damage tolerance allowables are being determined. For example, the material of the specimen 501 should not only be of the same material, but also have the same material conditions, such as ultimate tensile strength (UTS), heat-treatment, hardening condition, and material form, as the structural part of which the fatigue and damage tolerance allowables are being determined.

In one example embodiment, notch 503 is generated using an electrical discharge machining (EDM) method; however, it should be appreciated that other methods of creating notch 503 may be used, such as sawing, broaching, or milling, for example, as long as notch can be created with a curved portion R1.

Figure 19:
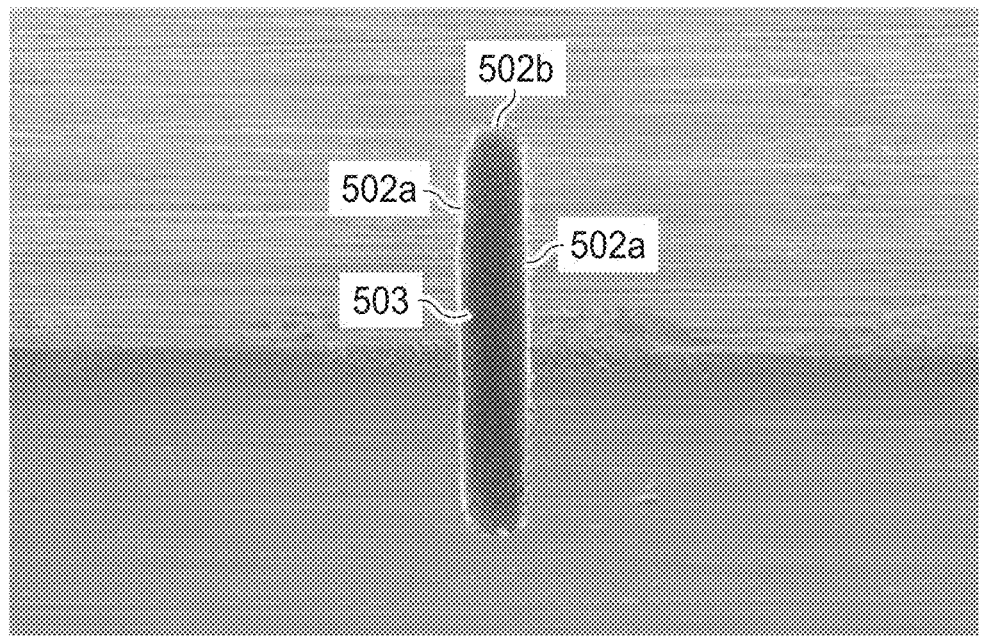
FIG. 19 a view of an EMD corner notch, according to one example embodiment.
Figure 20:
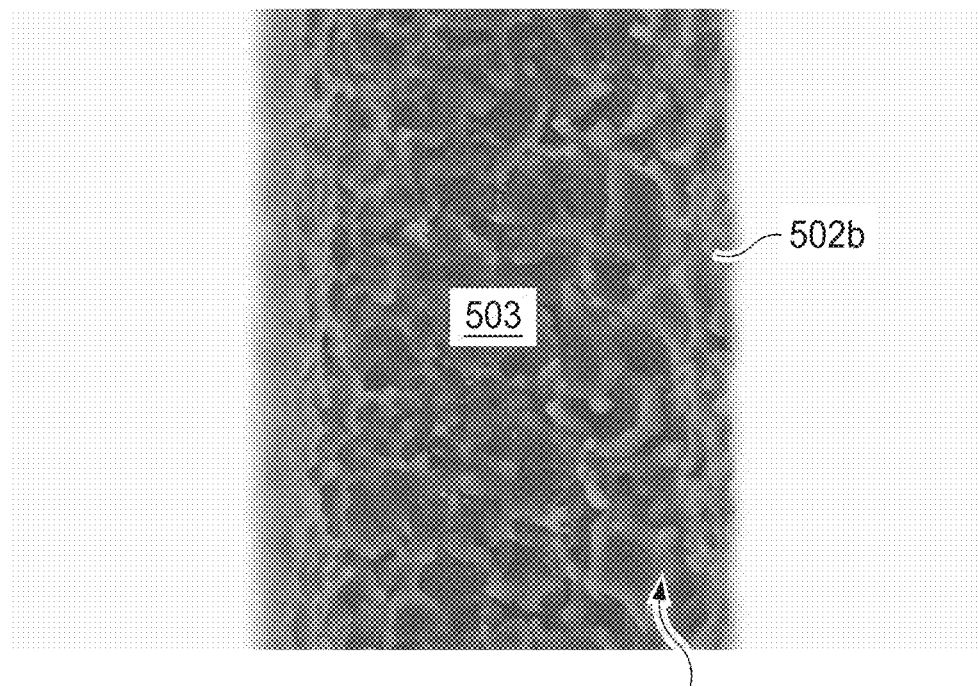
FIG. 20 a close up view of an EMD corner notch before chemical modification, according to one example embodiment.
Figure 21:
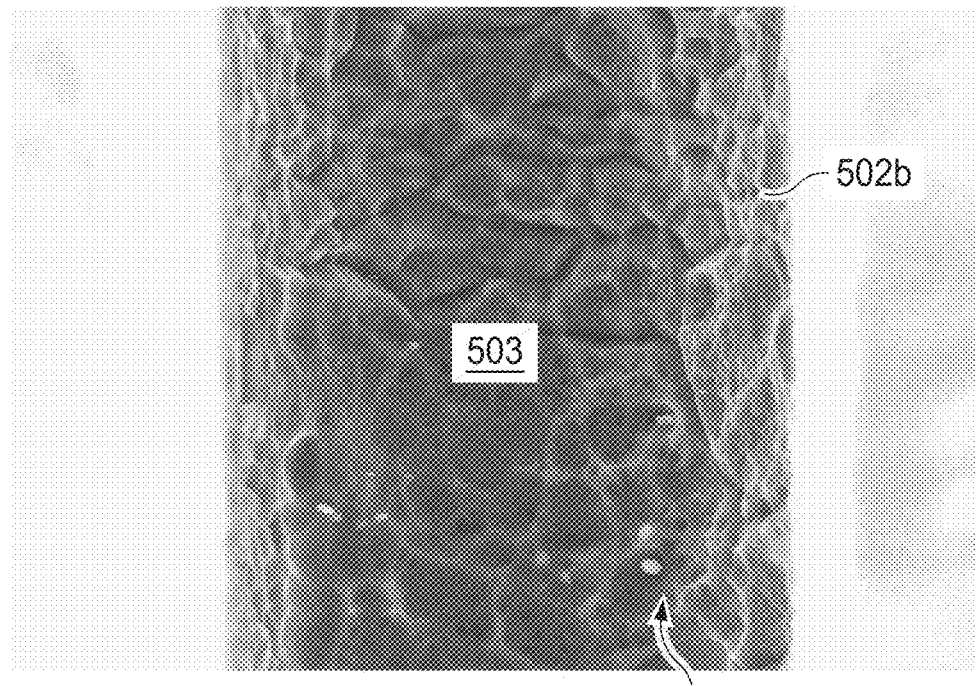
FIG. 21 a close up view of an EMD corner notch after chemical modification, according to one example embodiment.

Referring to FIGS. 19-22, a portion of notch 503 is metallurgically depicted. A post-notching selective surface treatment method can be desirable to modify the EDM corner notch of the specimen 501 for flaw simulation. One purpose of the treatment method is to remove at least a portion of the re-melt material layer 504 from a surface of the notch 503. In an exemplary embodiment, the notch treatment method includes removing at least a portion of the re-melt layer 504 from the root 502b of the notch 503. In other embodiments, the notch treatment method includes removing at least a portion of the re-melt layer 504 from the lateral sides 502a of the notch 503. Another important purpose of the treatment method is to chemically attack and weaken the grain boundaries on the etched surface 510 of notch 503 to make the evaluation more conservative. FIG. 19 shows an example of a corner notch 503 produced with an EMD process. FIG. 20 is a close-up view of the root 502b of the notch 503 with a re-melt layer 504 before a treatment method. FIG. 21 is a close-up view of root 502b of the notch 503 after a treatment method showing an etched surface 510 in the root 502b of the notch 503. A comparison between FIGS. 20 and 21 reveals that the re-melt layer 504 has been disintegrated and separated from a root notch 502b of notch 503 after the treatment. This results in a desired notch severity (worst notch) for the test.

Figure 22:
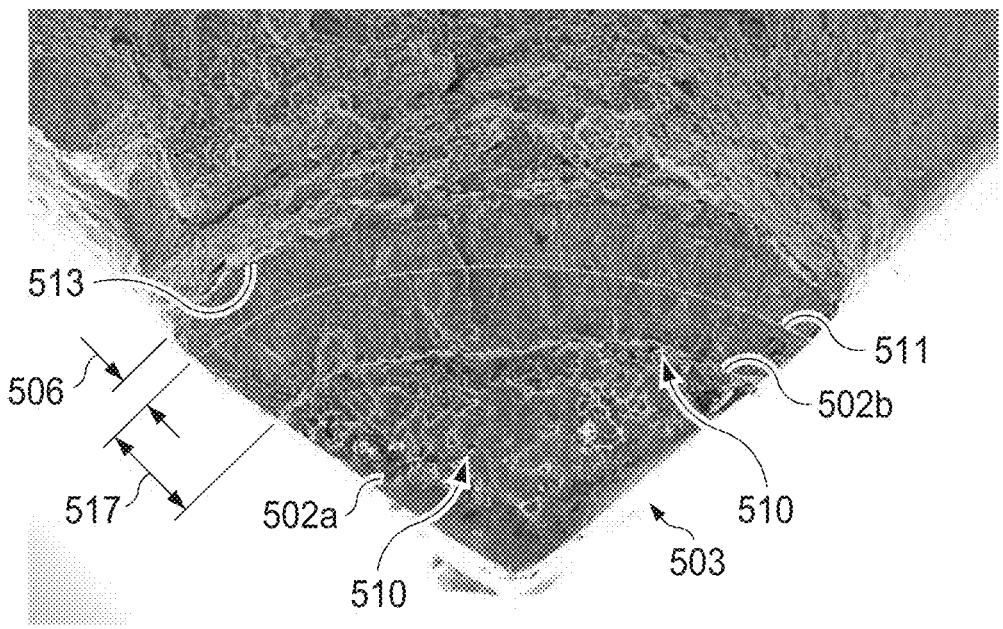
FIG. 22 a close up cross-sectional view of a notch front and crack front after chemical modification, according to one example embodiment.

FIG. 22 illustrates the notch 503 in a specimen 501 that has been sectioned at the crack plane after testing. Such a sectioning of specimens 501 can be performed to verify notch measurements and crack measurements using a scanning electron microscope (SEM) measurement, for example. Etching of the notch 503 results in an etched notch surface 510 on sides 502a and in the root 502b. During testing, a first stage crack growth 517 is created, which exists between notch root 502b and a first detected crack front 511. As discussed further herein, the test is temporarily halted upon detection of the first crack 511. The test can be resumed until a second stage crack growth 506 is created between first detected crack front 511 and a second detected crack front 513.

Figure 9:
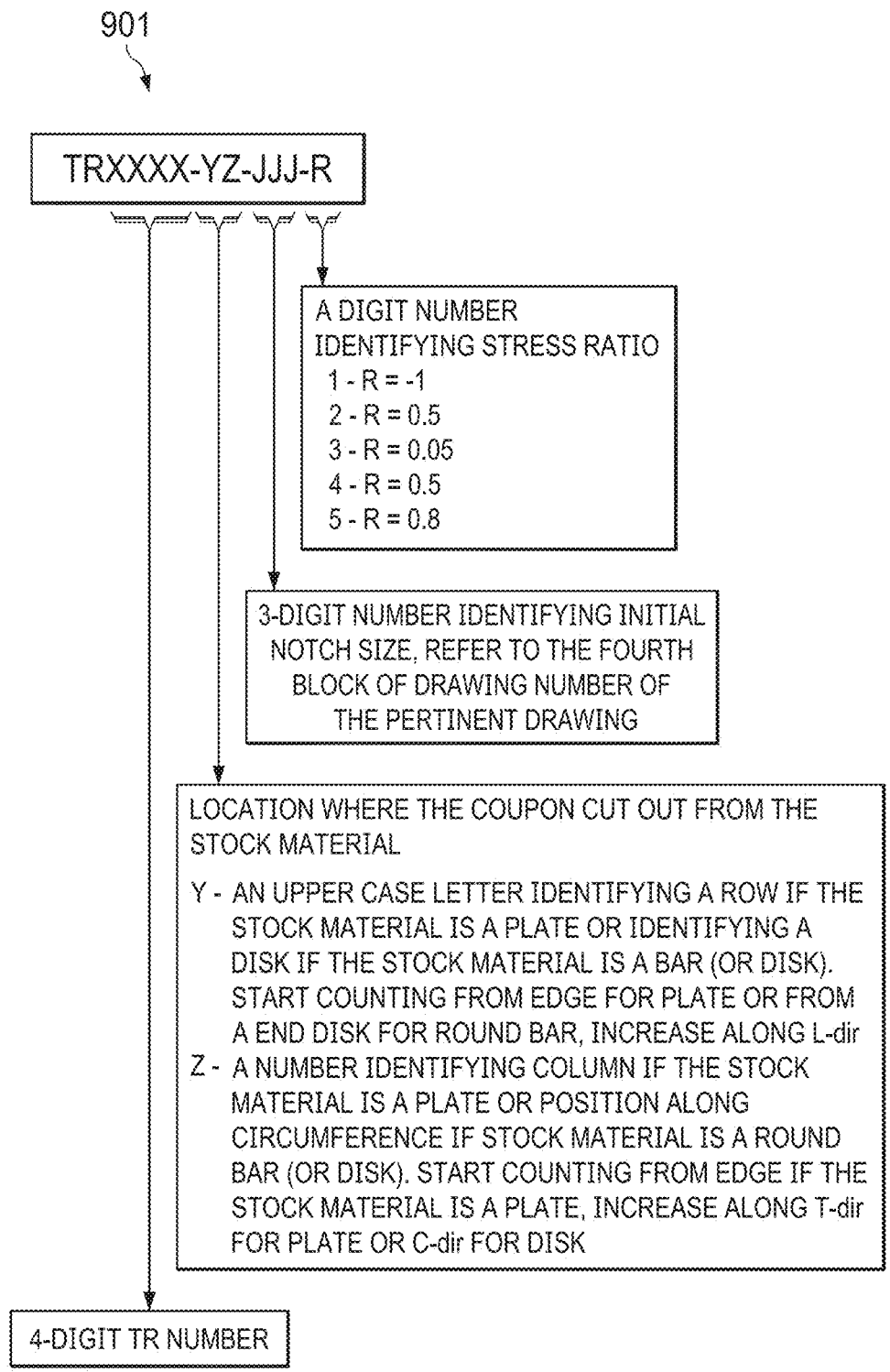
FIG. 9 is an illustrative specimen ID for a specimen, according to one example embodiment.

Now referring to FIG. 9, an exemplary specimen ID 901 can be utilized to mark each specimen 901 to keep track of critical information and insure accurate test data. The specimen ID 901 can include information such as: Test Request (TR) number, the location that specimen blank is cut out from the stock material, the notch size, and the stress ratio at which the coupon will be tested, as illustrated in FIG. 9.

Figure 10:
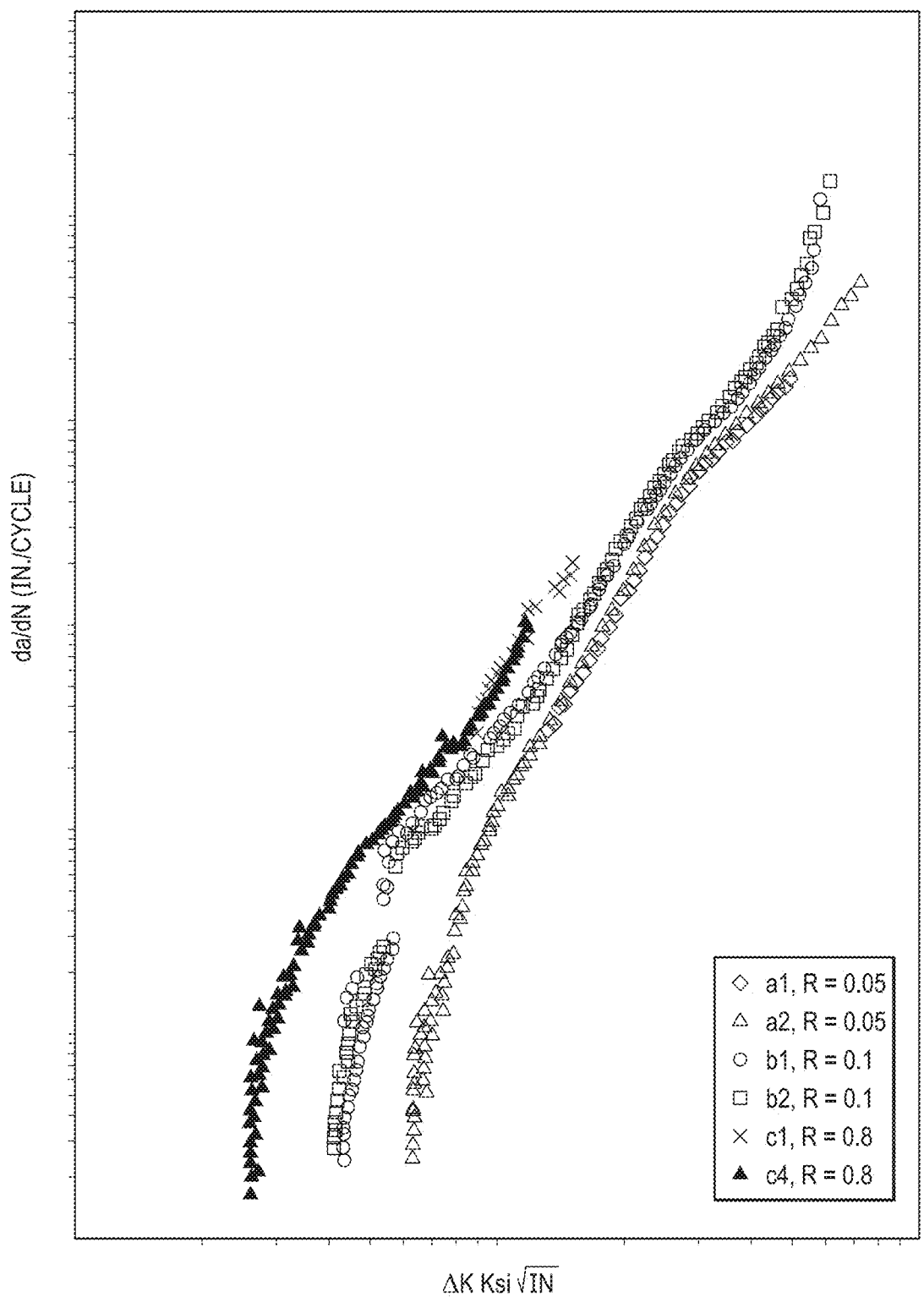
FIG. 10 is an illustrative da/dN vs. ΔK curve, according to one example embodiment.

Referring again to FIG. 2, method 201 further includes a step 205 of calculating an initial load. The step 207 of testing the specimen(s) 501 is an iterative process that starts with an initial load to converge the load to the point at which the flaw starts to grow. A reference da/dN vs. ΔK curve is preferred to narrow the range for the initial load determination. The reference information can be an existing $\Delta K_{TH}$ data or a plot of da/dN vs. ΔK curves referred for the material to be tested or for the materials that have characteristics similar to that to be tested. These characteristics include the chemical elements of the material, ultimate tensile strength (UTS), material form, and material treatments. FIG. 10 is an example of a da/dN vs. ΔK curve 1001 for Ti-6Al-4V.

Step 205 can further include using a stress intensity factor (SIF) to calculate the initial load. SIF equations for a corner notch (crack) of a square bar can be used in the initial load calculation. In one example embodiment, a correction factor can be used to account for geometrical effects on SIF. FIG. 8 depicts geometries and loading application for the test procedure. Table 2 lists the notations of FIG. 8 and the associated descriptions.

TABLE 2

Specimen Matrix

| Symbol | Description |
|---|---|
| $b_1$ | Width of the cross-section on the side of the gauge aligning with L-direction |
| $b_2$ | Width of the cross section on the side of the gauge align with T-direction |
| $S_0$ | Magnitude of uniform remote stress |
| $c_1$ | Flaw or crack length measured on the side aligning with L-direction of the gauge |
| $c_2$ | Flaw or crack length measured on the side aligning with T direction of the gauge |

Method 201 is an iterative process which can include an interval of cycles, such as 1,000,000 cycles for example, for each step of iteration until a flaw (or a crack) starts to grow. In order to determine the load at which a flaw starts to grow, the test starts with an initial load and iterates with the calculated load increments until the flaw grows. The initial load can be determined based on the reference threshold $\Delta K_{TH}$ for stress ratio $R_0=0$ and the traditional A=0.8 approximation for differentiated stress ratio $R_j$. Starting with the reference $\Delta K_{TH}$, Equations 1-8 are the basis to determine initial load from stress intensity factor (SIF) for a corner crack initiation test. By re-arranging Equation 1, with the support of Equations 2-8 and Table 301, the remote stress $S_0$ can be calculated. Multiplying $S_0$ by area of gauge cross-section, the initial load can be determined.

$$K = F_0 S_0 \sqrt{\pi c} \quad (1)$$

$$F_0 = f_x f_\phi f_a f_0 \quad (2)$$

$$f_x = \left[1 + 1.464\left(\frac{c1}{c2}\right)^{1.65}\right]^{-\frac{1}{2}}, \text{ for } \frac{c1}{c2} \le 1 \quad (3)$$

$$f_x = \left[1 + 1.464\left(\frac{c2}{c1}\right)^{1.65}\right]^{-\frac{1}{2}}, \text{ for } \frac{c1}{c2} > 1 \quad (4)$$

$$f_\phi = \left[\left(\frac{c1}{c2}\cos\phi\right)^2 + \sin^2\phi\right]^{\frac{1}{4}}, \text{ for } \frac{c1}{c2} \le 1 \quad (5)$$

$$f_\phi = \left[\cos^2\phi + \left(\frac{c2}{c1}\sin\phi\right)^2\right]^{\frac{1}{4}}, \text{ for } \frac{c1}{c2} > 1 \quad (6)$$

$\phi = 0°$ at $c_2$-tip,
$\phi = 90°$ at $c_1$-tip $$f_a = 1, \text{ for } \frac{c1}{c2} \le 1 \quad (7)$$

$$f_a = \sqrt{\frac{c2}{c1}}, \text{ for } \frac{c1}{c2} > 1 \quad (8)$$

$f_0$ = Tabular data (Table 301 in FIG. 3)

Referring again to FIG. 2, method 201 further includes a step 207 of testing the specimen(s) 501. Step 207 includes iteratively loading a specimen 501 at stepped loads for an implementation specific number of cycles until a flaw (or a crack) starts to grow in corner notch 503. The test process in step 207 starts with an Initial Load ($P_0$) and ends at the Final Load ($P_C$) at which the flaw (or crack) starts to grow. Each test determines the Final Load, Mean Stress, and Oscillatory Stress for the given crack size or flaw size, stress ratio, and limited cycles.

Figure 11:
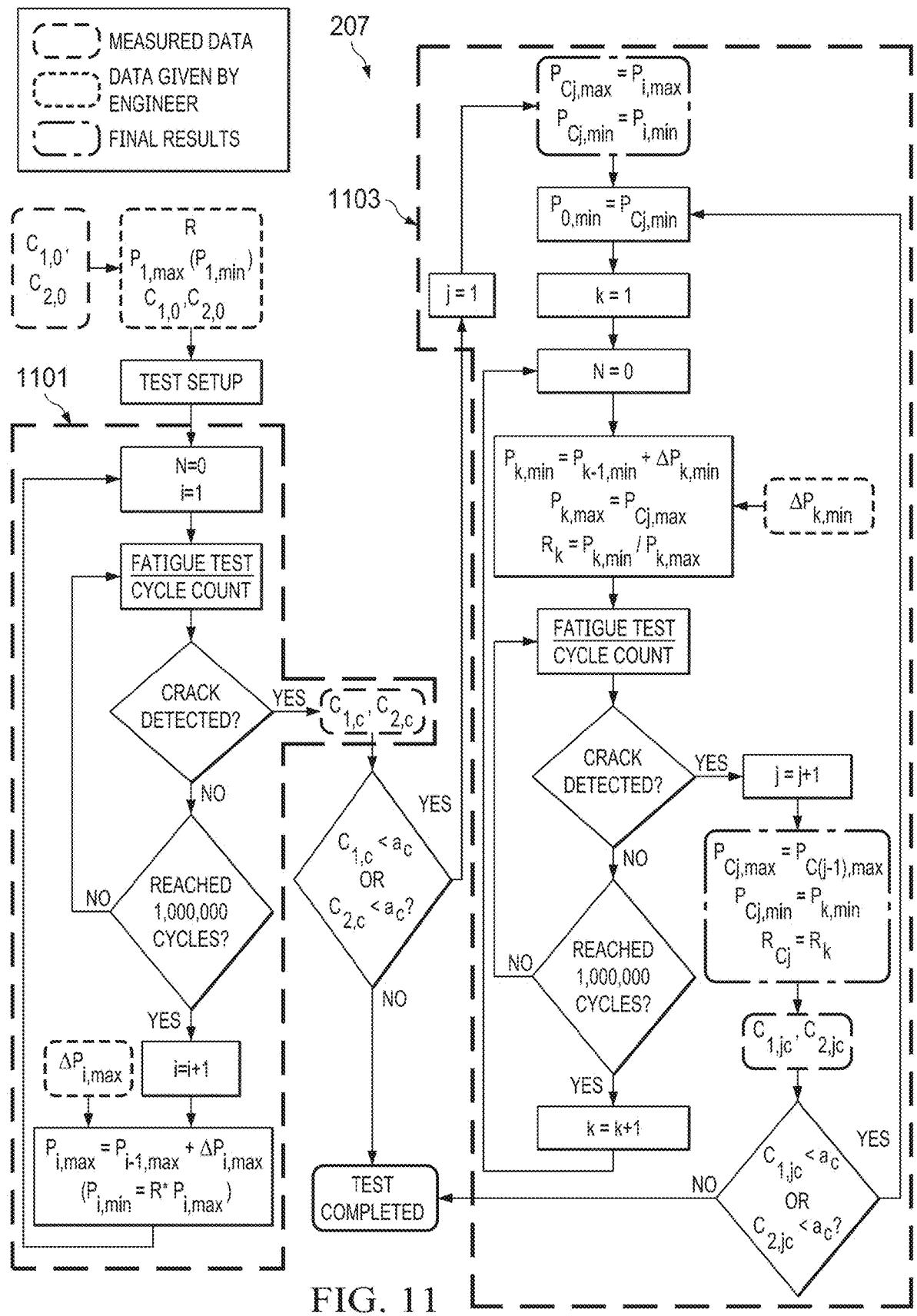
FIG. 11 is a schematic view of a process of testing a specimen, according to one example embodiment.

Referring also to FIG. 11, pretest data can include: 1) gauge section dimensions $b_1$ and $b_2$ (measurements), 2) notch dimensions $c_{1,0}$, $c_{2,0}$, and W, where W is the width of the notch (measurements), $c_{1,0}$ and $c_{2,0}$ are notch length measured on each side of the corner, 3) stress ratio R, 4) Initial Load $P_1$, 5) final crack length $c_{1,c}$ and $c_{2,c}$, 6) testing frequency, and 7) lab temperature (recorded by the testing lab), and 8) lab humidity (recorded by the testing lab).

After entering any pretest data, the testing step 207 can further include: installing the specimen 501, tuning for alignment, calibrating the measurement and data acquisition system, setting $P_{max}$ and $P_{min}$ for cyclic load, setting potential drop (PD) using a needle-spring method.

Figure 12:
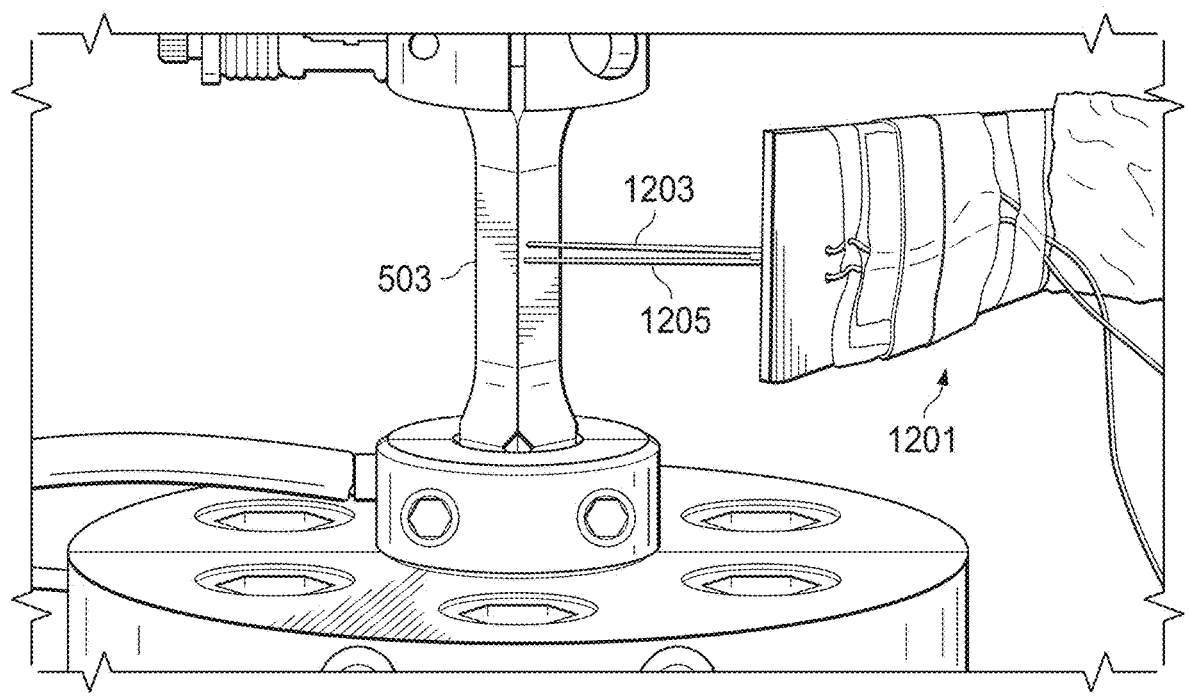
FIG. 12 is a perspective view of a test setup that uses a potential drop (PD) to determine an occurrence of crack growth, according to one example embodiment.

Referring also to FIG. 12, a specimen 501 is illustrated installed in a test setup. A first needle 1203 and a second needled 1205 are pressed against either side of the notch 503. During testing, a current is passed through the notch 502 between needles 1203 and 1205. The detection of crack growth is a result of a change in electrical resistance between needles 1203 and 1205. The utilization of needles 1203 and 1205 in a PD system 1201 prevents the need for welding or otherwise attaching sensors that could prove an undesired cracking or annealing of the specimen 501. In one example embodiment, the PD system 2101 is set such that the test stops when Δc=(0.001~0.004) inch, for example. In one example embodiment, the cycle count (N) is set to zero prior to the start of a test block, and the maximum cycle number is set to 1,000,000 for a testing block such that the test stops at N=1,000,000 if no Δa is detected.

Referring again to FIG. 11, step 207 of method 201 is illustrated in a block diagram format. Step 207 can be broken down between a constant R testing loop 1101 and a constant $P_{max}$ testing loop 1103. Each of the constant R testing loop 1101 and a constant $P_{max}$ testing loop 1103 are discussed further herein.

Figure 13:
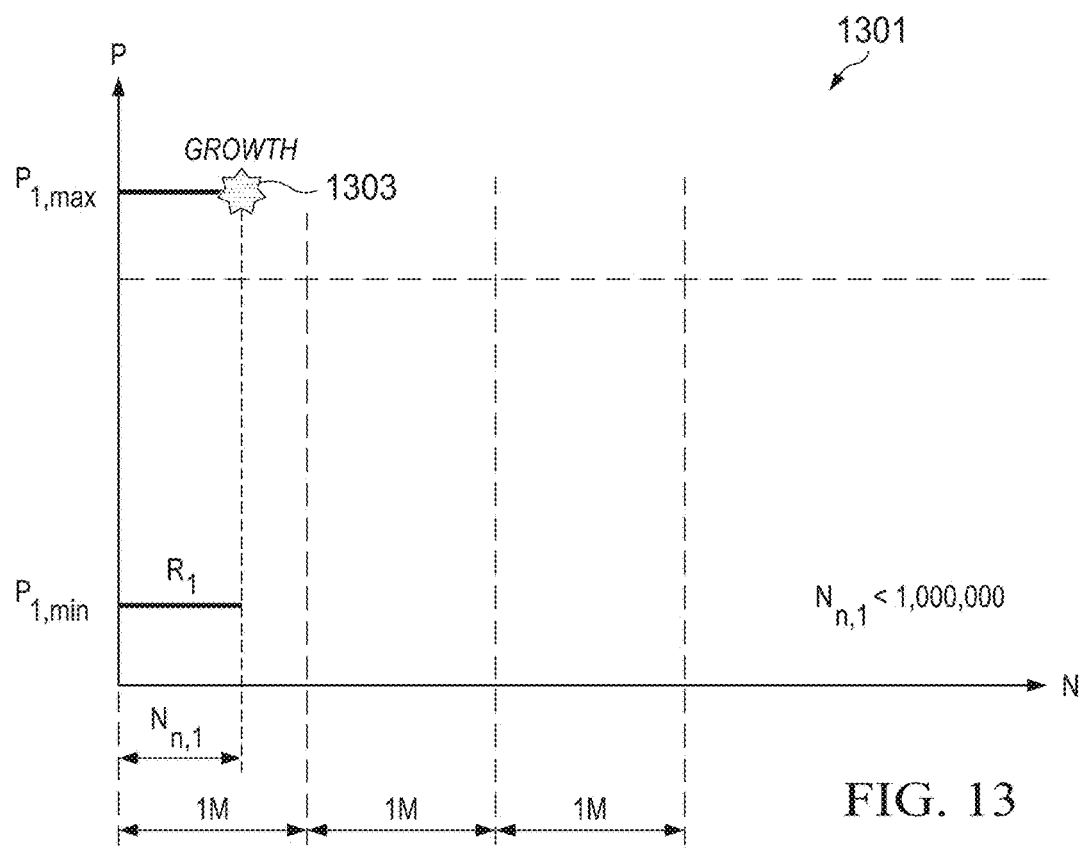
FIG. 13 is a graph, according to one example embodiment.
Figure 14:
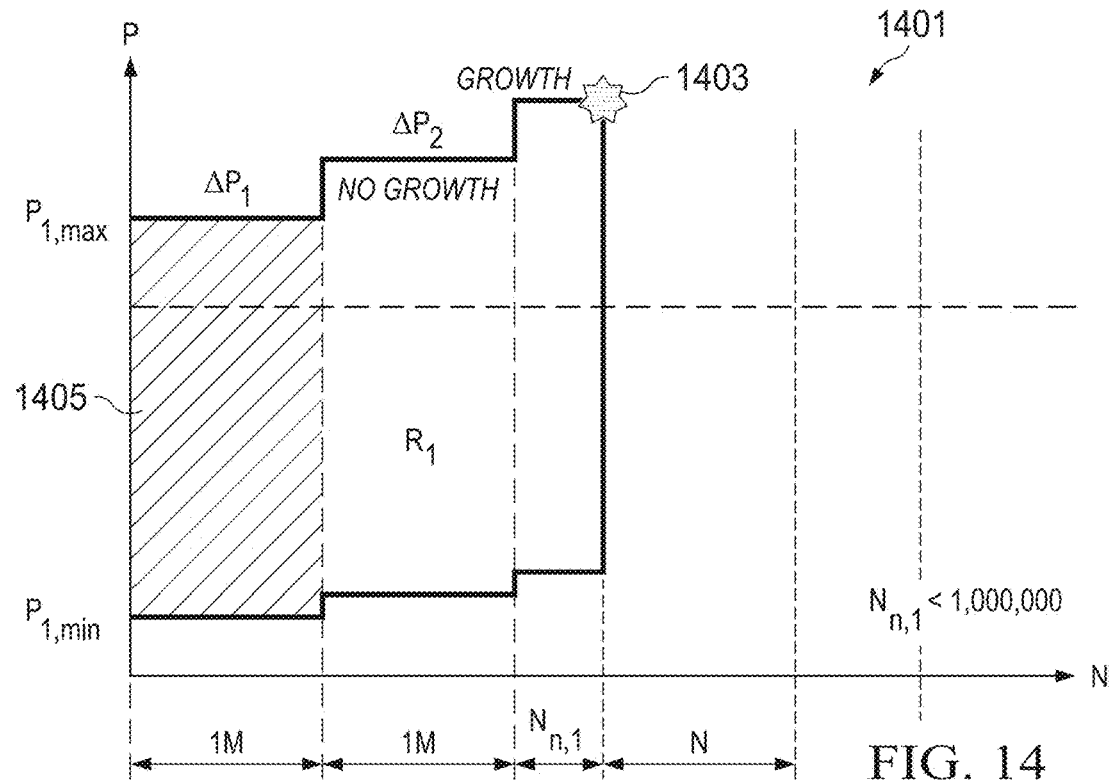
FIG. 14 is a graph, according to one example embodiment.

The constant R testing loop 1101 can include starting the test with the PD 1201 turned on and cycle count on. If a crack extension is detected via the PD 1201, the test is stopped, as shown in graph 1301 of FIG. 13. In the illustrated graph 1301, a crack extension is detected at occurrence 1303, which is as a point in time short of the first full 1,000,000 cycles. Next the crack dimensions are measured. In one example embodiment, the dimensions of the crack, such as first crack 507, can be measured by an optical microscope on the sides of specimen 501 while the specimen is still attached to the test setup. If crack dimensions exceed the given final crack length $a_c$ and $c_c$, the test is completed and the results are reported. If crack dimensions do not reach $a_c$ and $c_c$, then the test proceeds to the next step. If a crack extension is not detected, the test continues until 1,000,000 cycles are reached and a testing block is considered completed. An example completed testing block that did not experience crack extension is illustrated as testing block 1405 as shown by graph 1401 in FIG. 14. The next step-load is prepared, the cycle count is reset to zero, and the test restarted. The steps are repeated until a crack extension is detected or until "stop-test", whichever comes first, then the constant R testing loop 1101 (FIG. 11) is exited. In the illustrated graph 1401, a crack extension is detected at occurrence 1403, which is as a point in time after two full 1,000,000 cycles, but short completion of the third stepped 1,000,000 cycle testing block.

Figure 15:
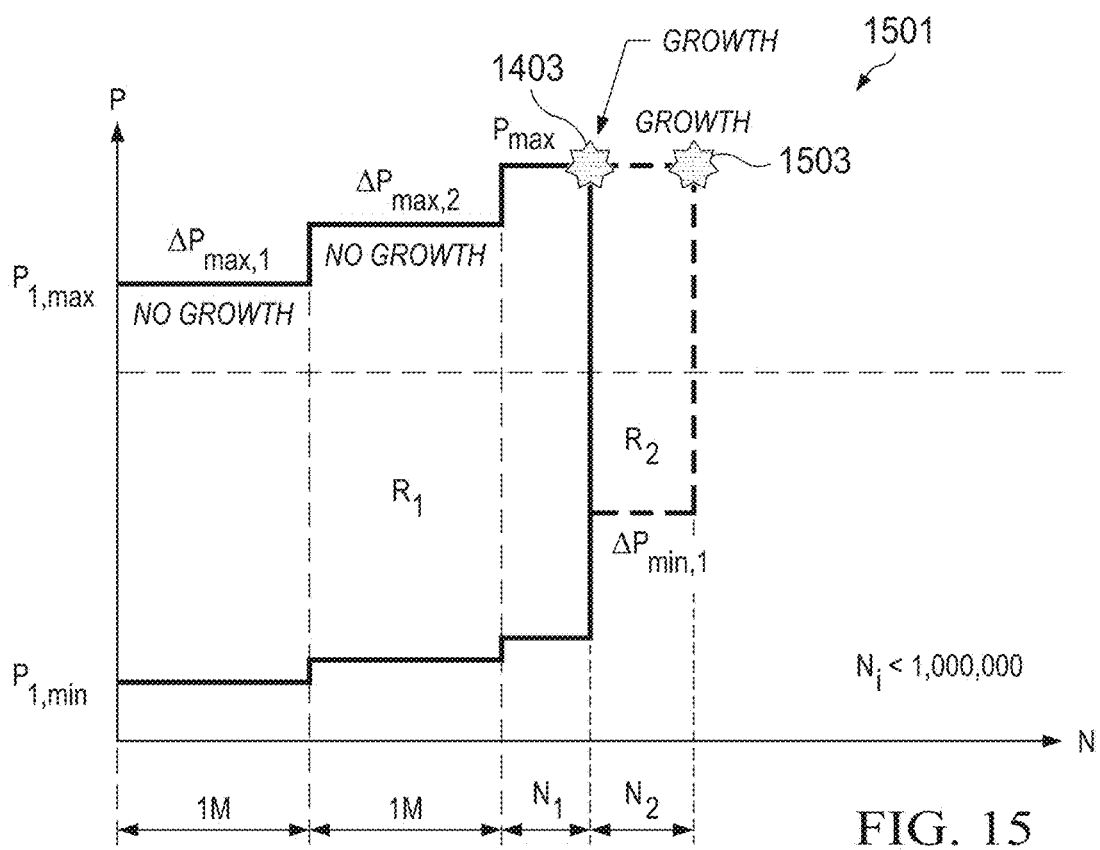
FIG. 15 is a graph, according to one example embodiment.

The constant $P_{max}$ testing loop 1103 with stepped $P_{min}$, constant $P_{max}$, and varying R can include resetting cycle count to zero and resetting loads with an increased $P_{min}$ while keeping the $P_{max}$ the same as that at the constant R loop 1101. Next the test is resumed with cycle count and PD 1201 turned on. If a crack extension is detected at an occurrence 1503 via PD, the test is stopped, as shown in graph 1501 of FIG. 15.

Figure 16:
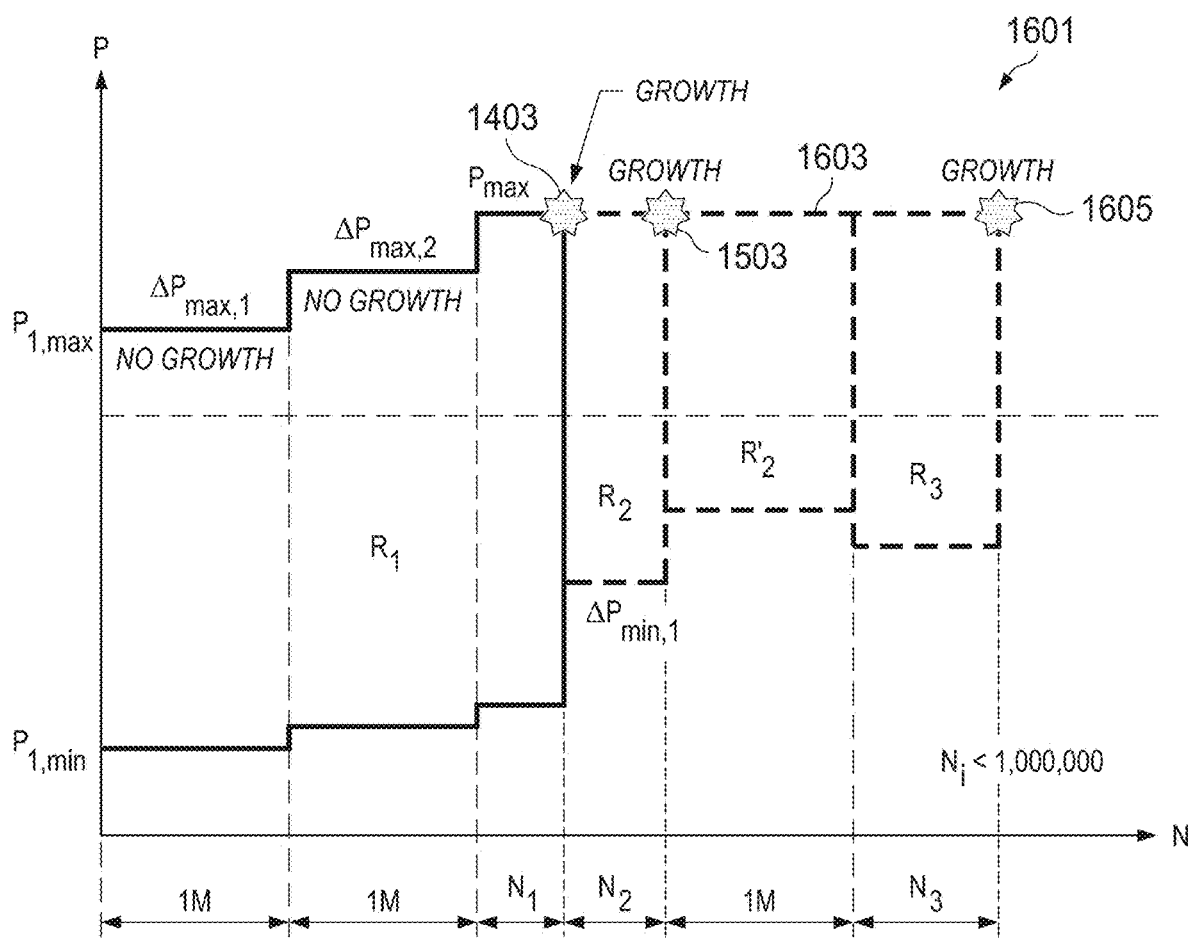
FIG. 16 is a graph, according to one example embodiment.

Next the extended crack dimension is measured. If the crack dimension exceeds the given final crack length $a_c$ and $c_c$, the test is completed. If the crack dimensions do not reach $a_c$ and $c_c$, then the test continues to the next step. If a crack extension is not detected by PD 1201, the test continues until 1,000,000 cycles are reached at occurrence 1603 and a testing block is considered completed, as shown in graph 1601 of FIG. 16. The results are reported and the process proceeds with the next step-load and instructions. The steps are repeated until a crack extension is detected at an occurrence 1605 or until "stop-test", whichever comes first, then the constant $P_{max}$ testing loop 1103 (FIG. 11) is exited.

Method 201 can also include a step 209 of processing the data from the test. Step 209 is intended to extract the specimen and testing information for each test and determine the validity of the testing result data. Valid data for a threshold testing program can be defined as the data at the crack initiation (or extension) $\Delta c/\Delta N \leq 4 \times 10^{-9}$ in/cycle. If this criterion is met at the crack initiation, the load is valid as a threshold for no-growth. If the threshold criterion is not met at the crack initiation, the previous run-out load can be used instead.

The immediate test data are the no-growth threshold fatigue loads, i.e. maximum load $P_{max}$ and minimum load $P_{min}$, from which fatigue mean and oscillatory load $P_{mean}$ and $P_{osc}$ can be converted:

$$P_{mean} = (P_{max} + P_{min})/2 \tag{Eq. 1}$$

$$P_{osc} = (P_{max} - P_{min})/2 \tag{Eq. 2}$$

The no-growth threshold stresses (e.g., Mean Stress as Eq. 3, Oscillatory stress as Eq. 4) can be calculated as loads divided by notch plane area A:

$$s_{mean} = P_{mean}/A \tag{Eq. 3}$$

$$s_{osc} = P_{osc}/A \tag{Eq. 4}$$

Notch plane area A is calculated/determined by $A = b_1 \times b_2$ ($b_1$ and $b_2$ are as shown in FIG. 8).

Referring now to FIG. 25, a method 1711 for defining a threshold stress curve utilized in damage tolerance analysis, is schematically illustrated. The method 1711 can include the step 1713 of conducting a direct test method on a plurality of specimens with a notch to generate raw data. The notches in the plurality of specimens can be chemically treated post-notching to remove at least a portion of the re-melt material layer. A step 1715 can include determining a plurality of analyzed data points based upon the raw data. A step 1717 can include determining a regression line 1703 based upon the plurality of analyzed data points. The regression line comprising an exponential portion and a power law portion. A step 1719 can include connecting the exponential portion and the power law portion of the regression line to form a threshold stress curve. Each of these steps are described in further detail herein.

Step 1713 includes conducting a direct test method (e.g., method 201) on a plurality of specimens with a notch to generate raw data. In an embodiment, at least some of the specimens in the plurality of specimens with a notch are as described herein (e.g., a specimen 501 that has a square cross-sectional portion and the notch 503 is located in a corner of the square cross-sectional portion). The notch in each of the plurality of specimens has a notch dimension. For example, but not limitation, the nominal notch dimension can be a notch length of $c_{1,0} = c_{2,0} = 0.010$ inch (as shown in Table 2). It should be noted that notch length is merely an example of a notch dimension and that other geometries and dimensions can be used in step 1713.

Step 1715 of determining a plurality of analyzed data points based upon the raw data can include at least one of the following steps: a step 1721 of categorizing the raw data into crack data or flaw data; a step 1723 of selecting the categorized raw data with a substantially similar dimension; a step 1725 of collapsing at least a portion of the categorized data; step 1727 of generating the plurality of analyzed data points; and a step 1729 of plotting the plurality of analyzed data points onto an X-Y coordinate plane.

In an embodiment of step 1721, the raw data is categorized into crack data or flaw data. The crack data can include the final crack length $c_{1,c}$ and $c_{2,c}$ and the associated results including Final Load, Mean Stress, and Oscillatory Stress. The flaw data can include the flaw size ($c_{i,o}$) and the associated results including Final Load, Mean Stress, and Oscillatory Stress.

Categorized data (e.g., the categorized crack data and the categorized flaw data) with a substantially similar dimension is selected in step 1723. The substantially similar dimension can be at least one of the following: a flaw size, a notch length, and a final crack length. For example, the substantially similar dimension can be a nominal notch length (flaw size) of $c_0 = 0.010$ inch. The testing results (e.g., Final Load, Mean Stress, and Oscillatory Stress) associated with the substantially similar dimension are selected along with the substantially similar dimension in step 1723.

In step 1725 at least a portion of the selected data with the substantially similar dimension can be collapsed to a master dimension. The actual final flaw sizes, final crack lengths, or notch length may be close but not the same as the nominal length. The actual final flaw sizes, final crack lengths, or notch lengths can be adjusted based on a geometrical parameter β of Linear Elastic Fracture Mechanics (LEFM adjustment). An exemplary equation for an LEFM adjustment for notch length is shown below:

$$S_{nominal}=S_{actual}(\beta_{actual}/\beta_{nominal})\sqrt{(c_{i,j,actual}/c_{i,j,nominal})} \quad (Eq. 5)$$

where i=1 or 2, each standing for flaw or crack on one of the two sides of the corner; j=0 or c, each standing for flaw or crack.

For example, in a group of nominal $c_{i,0}$=0.010-in, the actual notch dimensions can be measured as 0.012, 0.009, 0.010, 0.012, 0.010, 0.008, 0.011, etc. The LEFM adjustment can be made to collapse the non 0.010-in data onto 0.010-in equivalent, which is the master dimension in this example. In some embodiments, the master dimension is substantially similar to and can be equal to the nominal length. Similarly, if the final crack lengths measured during testing are different from the actual crack lengths determined in a post-test measurement, the actual crack length can be adjusted using Eq. 5 to determine the master dimension.

Table 3 shows an example of categorized raw data for a crack including testing results for a selection having a notch length of a substantially similar dimension (e.g., a nominal notch length of $c_{i,0}$=0.010 in).

3. The stress ratio R can include at least a negative stress ratio R−, a zero stress ratio R=0, and at least a positive stress ratio R+.

If a portion of the plurality of analyzed data points has at least a negative stress ratio R−, a step 1733 can include performing a regression with an exponential fitting of the analyzed data points having the negative stress ratio to generate the exponential portion of the regression line, which can extend to the positive stress ratio $R^+$ to fit the applicable data points of $R^+$. In an embodiment, the exponential fitting is achieved by an exponential regression curve fitting determination by MATLAB.

If a portion of the plurality of the analyzed data points has at least a positive stress ratio R+, a step 1735 can include performing a regression with a power-law fitting of the analyzed data points having the positive stress ratio to generate the power law portion of the regression line, which can extend to the negative stress ratio $R^-$ to fit the applicable data points of $R^-$. A power-law function achieves a power-law profile for the power-law portion of the regression line. In an embodiment, the power law fitting is achieved by a power law determination performed by MATLAB using a curve fitting power function.

Step 1719 can include connecting the exponential portion and the power law portion of the regression line to form a

TABLE 3

Example Data Table of Organized Geometrical and Test Results Data

| Notch Length | Speci- men# | 0' - Notch | | 1 - Crack | | | | | $P_{max}$ (at break) | $P_{max}$ (pre- vious) | Runout at last run? | $c_1/c_2$ | ΔC, min | ΔC, max |
|---|---|---|---|---|---|---|---|---|---|---|---|---|---|---|
| | | $c_{1,0}$ | $c_{2,0}$ | $c_{1,c}$ | $C_{2,c}$ | b1 | b2 | R | N | | | | | | |
| 0.010 | TR4473-B1-103-1 | 0.0115 | 0.0105 | 0.0160 | 0.0150 | 0.2593 | 0.2607 | −1 | 643,483 | 1,808 | 1,469 | no | 1.095 | 0.0045 | 0.005 |
| | TR4473-B2-103-1 | 0.0100 | 0.0098 | 0.0110 | 0.0110 | 0.2597 | 0.2592 | −1 | 33,370 | 1,900 | 1,543 | no | 1.020 | 0.001 | 0.001 |
| | TR4473-B5-103-3 | 0.0118 | 0.0107 | 0.0210 | 0.0150 | 0.2600 | 0.2600 | 0.05 | 59,278 | 3,087 | 2,487 | no | 1.103 | 0.004 | 0.009 |
| | TR4473-B6-103-3 | 0.0092 | 0.0110 | 0.0130 | 0.0130 | 0.2597 | 0.2606 | 0.05 | 182,745 | 3,205 | 2,787 | no | 0.836 | 0.002 | 0.004 |
| | TR4473-B8-103-3 | 0.0127 | 0.0106 | 0.0127 | 0.0106 | 0.2594 | 0.2603 | 0.05 | 1,000,000 | 2,752 | 2,061 | yes | 1.198 | 0.000 | 0.000 |
| | TR4473-B9-103-4 | 0.0098 | 0.0093 | 0.0098 | 0.0093 | 0.2603 | 0.2604 | 0.50 | 1,000,000 | 4,611 | 3,747 | yes | 1.054 | 0.000 | 0.000 |
| | TR4473-B11-103-5 | 0.0093 | 0.0106 | 0.0093 | 0.0106 | 0.2606 | 0.2606 | 0.74 | 1,000,000 | 6,621 | 0 | yes | 0.877 | 0.000 | 0.000 |
| | TR4473-B11-103-6 | 0.0093 | 0.0106 | 0.0093 | 0.0106 | 0.2606 | 0.2606 | 0.80 | 1,000,000 | 6,621 | 5,857 | yes | 0.877 | 0.000 | 0.000 |

Based on this data in Table 3, the threshold loads are determined, and the threshold stresses are calculated accordingly to generate a plurality of analyzed data points in step 1727 by using equations 1-4 (e.g. $P_{mean}$ (Eq. 1), $P_{osc}$, (Eq. 2), Mean Stress (Eq. 3), and Oscillatory Stress (Eq. 4).

Figure 17:
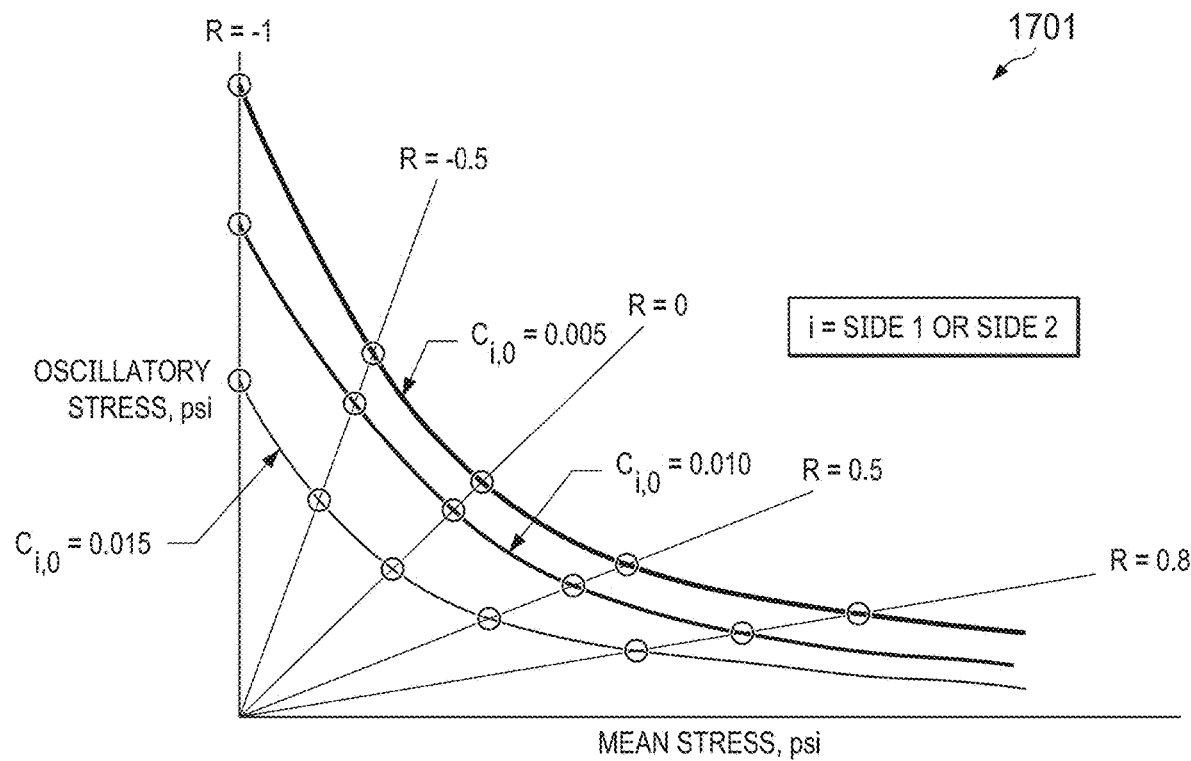
FIG. 17 is a graph illustrating threshold stress curves, according to one example embodiment.

The plurality of analyzed data points are then plotted in step 1729 onto an X-Y coordinate plane as shown in FIG. 17. An exemplary X-Y coordinate plane shows values for mean stress on the x-axis and the values for the oscillatory stress on the y-axis.

Method 1711 includes the step 1717 of determining a regression line based upon the plurality of data points, the regression line comprising an exponential portion and a power law portion comprises a step 1731 of identifying a stress ratio R based on the raw data. The stress ratio R is as described herein (e.g., the stress ratio R is the ratio of minimum stress divided by maximum stress). An illustrative example of stress ratios R are shown in the raw data in Table threshold stress curve. Step 1719 can include determining the connecting point which is the tangential point to both the exponential and the power law curves. In particular, the connecting point is determined by letting the derivative of the exponential fitting curve equate to the derivative of the power law fitting curve such that a smooth connection therebetween can be achieved. More specifically, step 1719 can include connecting the exponential fitting curve and the power law fitting curve at the point where the derivative for the fitting curves equate each other.

Exemplary threshold stress curves are shown in FIGS. 17 and 24. FIG. 17 includes threshold stress curves for no-growing flaws. During damage tolerance analysis, if the data point is below the threshold stress curve, the crack does not initiate from the flaw, and the data point and the related probable flaw in the analyzed component is allowable. If the data point is above the threshold stress curve, the crack will initiate from the flaw, and such a flaw is not allowable for the analyzed component.

FIG. 24 illustrates threshold stress curves for various flaw sizes, shown as solid lines 2401, 2403, 2405 and various crack lengths 2402, 2404, 2406 for a particular metallic material. The threshold test curves 2401, 2403, 2405 are illustrated with various notch lengths designated as are illustrated with $c_{0,1} < c_{0,2} < c_{0,3}$.

Referring now to FIG. 4, a method 401 of a designing and manufacturing a part or structure of an aircraft, such as rotorcraft 101, is schematically illustrated. An illustrative structure is bulkhead 113, shown in FIG. 1. A step 403 can include designing a structure with a computer aided design (CAD) tool which can include defining a preliminary geometry of the structure. Step 403 can include performing a stress analysis of the structure, this analysis can include analytically subjecting the structure to loads, calculating the stress, and evaluating the stress with regard to the fatigue and damage tolerance allowables, the fatigue and damage tolerance allowables being calculated using method 201 described herein. Step 403 can include iteratively changing the geometry of the part until a weight efficient configuration is reached. In one embodiment, the geometry of the structure is iteratively optimized so as to meet the stress allowables without having unnecessary weight. A step 405 can include manufacturing the structure to the geometry defined in step 403.

Figure 18:
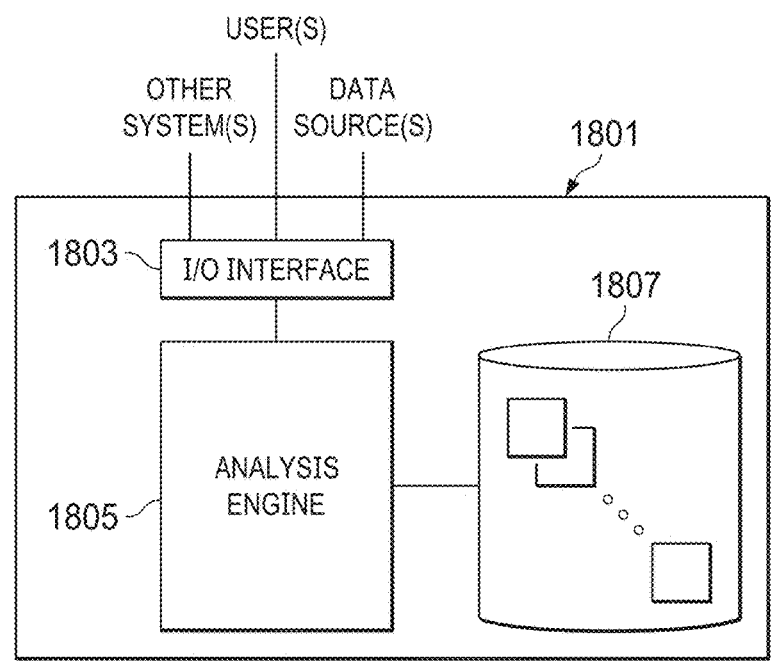
FIG. 18 is a schematic view of a computer system, according to one example embodiment.

Referring now also to FIG. 18, a computer system 1801 is schematically illustrated. Computer system 1801 can be configured for performing one or more functions with regard to the operation of system and method further disclosed herein. Further, any processing and analysis can be partly or fully performed by computer system 1801. Computer system 1801 can be partly or fully integrated with other aircraft computer systems.

The system 1801 can include an input/output (I/O) interface 1803, an analysis engine 1805, and a database 1807. Alternative embodiments can combine or distribute the input/output (I/O) interface 1803, analysis engine 1805, and database 1807, as desired. Embodiments of the system 1801 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multipurpose machines, for example computer workstations, that are suitable for also performing other tasks.

The I/O interface 1803 can provide a communication link between external users, systems, and data sources and components of the system 1801. The I/O interface 1803 can be configured for allowing one or more users to input information to the system 1801 via any known input device. Examples can include a keyboard, mouse, touch screen, and/or any other desired input device. The I/O interface 1803 can be configured for allowing one or more users to receive information output from the system 1801 via any known output device. Examples can include a display monitor, a printer, cockpit display, and/or any other desired output device. The I/O interface 1803 can be configured for allowing other systems to communicate with the system 1801. For example, the I/O interface 1803 can allow one or more remote computer(s) to access information, input information, and/or remotely instruct the system 1801 to perform one or more of the tasks described herein. The I/O interface 1803 can be configured for allowing communication with one or more remote data sources. For example, the I/O interface 1803 can allow one or more remote data source(s) to access information, input information, and/or remotely instruct the system 1801 to perform one or more of the tasks described herein.

The database 1807 provides persistent data storage for system 1801. While the term "database" is primarily used, a memory or other suitable data storage arrangement may provide the functionality of the database 1807. In alternative embodiments, the database 1807 can be integral to or separate from the system 1801 and can operate on one or more computers. The database 1807 preferably provides non-volatile data storage for any information suitable to support the operation of the system and method disclosed herein, including various types of data discussed further herein. The analysis engine 1805 can include various combinations of one or more processors, memories, and software components.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

The invention claimed is:

1. A method for defining a threshold stress curve utilized in damage tolerance analysis, the method comprising:
   conducting a direct test method on a plurality of specimens with a notch to generate raw data, the notch in each of the specimens having a notch dimension, the step of conducting the direct test method comprises:
   applying a cyclic load to each of the specimens in a plurality of specimens with a notch until a first crack emanating from the notch is detected, the cyclic load having a maximum load and a minimum load; and
   applying a subsequent cyclic load to each of the specimens until extension of the first crack to form a second crack emanating from the first crack is detected, the subsequent cyclic load having the same maximum load but a greater minimum load;

determining a plurality of analyzed data points based upon the raw data;

determining a regression line based upon the plurality of data points, the regression line comprising an exponential portion and a power law portion; and connecting the exponential portion and the power law portion of the regression line to form a threshold stress curve based on the regression line.

2. The method according to claim 1, wherein each of the specimens has a square cross-sectional portion and the notch is located in a corner of the square cross-sectional portion.

3. The method according to claim 1, wherein the step of determining a plurality of analyzed data points comprises:
categorizing the raw data into crack data or flaw data.

4. The method according to claim 3, wherein the step of determining a plurality of analyzed data points comprises:
selecting the categorized raw data of a substantially similar dimension.

5. The method according to claim 4, wherein the step of determining a plurality of analyzed data points comprises:
collapsing at least a portion of the categorized raw data to a nominal dimension.

6. The method according to claim 4, wherein the substantially similar dimension comprises at least one of the following: a flaw size, a notch length, and a crack length.

7. The method according to claim 4, wherein the step of adjusting the raw data comprises:
generating the plurality of analyzed data points from the categorized and selected raw data.

8. The method according to claim 7, wherein the step of determining a plurality of analyzed data points comprises:
plotting the plurality of analyzed data points onto an X-Y coordinate plane.

9. The method according to claim 7, wherein the step of determining a regression line based upon the plurality of data points further comprising:
identifying a stress ratio (R) based on the raw data, the stress ratio comprising at least a negative stress ratio, a zero stress ratio, and at least a positive stress ratio.

10. The method according to claim 9, wherein the step of determining a regression line based upon the plurality of data points further comprising:
if a portion of the plurality of analyzed data points has at least a negative stress ratio (R−), performing a regression with an exponential fitting of the plurality of analyzed data points having the negative stress ratio to generate the exponential portion of the regression line; and if a portion of the plurality of the analyzed data points has at least a positive stress ratio (R+), performing a regression with a power law fitting of the plurality of analyzed data points having the positive stress ratio to generate the power law portion of the regression line.

11. The method according to claim 9, wherein the step of connecting comprises:
performing a derivative function to have a smooth connection between the exponential portion and the power law portion of the regression line.

12. The method according to claim 1, wherein points below the threshold stress curve indicate that a flaw or crack is not growing and points above the threshold stress curve indicate that a flaw or crack is growing.

* * * * *